(12) United States Patent
Viger et al.

(10) Patent No.: US 12,408,153 B2
(45) Date of Patent: Sep. 2, 2025

(54) ACCESS TO RANDOM RESOURCE UNITS BY A PLURALITY OF BSSs

(71) Applicant: CANON KABUSHIKI KAISHA, Tokyo (JP)

(72) Inventors: Pascal Viger, Janze (FR); Stéphane Baron, Le Rheu (FR); Patrice Nezou, Liffre (FR)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 18/482,771

(22) Filed: Oct. 6, 2023

(65) Prior Publication Data

US 2024/0040630 A1    Feb. 1, 2024

Related U.S. Application Data

(63) Continuation of application No. 17/587,951, filed on Jan. 28, 2022, now Pat. No. 11,818,765, which is a continuation of application No. 16/081,399, filed as application No. PCT/EP2017/055490 on Mar. 8, 2017, now Pat. No. 11,382,134.

(30) Foreign Application Priority Data

Mar. 11, 2016    (GB) ..................................... 1604208

(51) Int. Cl.
*H04W 74/0833*    (2024.01)
*H04W 72/0446*    (2023.01)
*H04W 72/121*    (2023.01)

(52) U.S. Cl.
CPC ... *H04W 74/0833* (2013.01); *H04W 72/0446* (2013.01); *H04W 72/121* (2013.01)

(58) Field of Classification Search
CPC ... H04W 72/12; H04W 84/12; H04W 72/121; H04W 72/1289; H04W 74/0816; H04W 74/0833; H04W 72/0446
See application file for complete search history.

(56) References Cited

U.S. PATENT DOCUMENTS

| | | | |
|---|---|---|---|
| 10,856,212 B2 * | 12/2020 | Viger | .................... H04W 48/12 |
| 11,284,435 B2 * | 3/2022 | Sevin | ...................... H04L 5/001 |
| 11,382,134 B2 * | 7/2022 | Viger | ................ H04W 74/0833 |
| 11,818,765 B2 * | 11/2023 | Viger | ................ H04W 74/0833 |
| 2011/0013608 A1 * | 1/2011 | Lee | ........................ H04W 72/04 370/338 |

(Continued)

*Primary Examiner* — Benjamin H Elliott, IV
(74) *Attorney, Agent, or Firm* — Canon U.S.A., Inc. IP Division

(57) ABSTRACT

A physical AP manages a plurality of BSSs through VAPs. The AP sends a trigger frame to reserve a TXOP including resource units the nodes access to transmit data during the reserved TXOP. To improve channel utilization, the trigger frame identifies a plurality of groups, nodes of which are allowed to access the resources units to transmit data during the reserved TXOP. Thus, the AP receives, during the reserved TXOP, data from one node of a first group identified in the trigger frame and data from one node (separate from the first one) of a second and separate group identified in the trigger frame. A single access by the AP to the medium is thus required, reducing the channel occupation due to control frames. In some embodiments, the number of trigger frames can be drastically reduce, while offering resource units to several BSSs.

12 Claims, 9 Drawing Sheets

(56) References Cited

U.S. PATENT DOCUMENTS

| | | | |
|---|---|---|---|
| 2014/0078969 A1* | 3/2014 | Guo | H04W 72/121 |
| | | | 370/329 |
| 2015/0009879 A1* | 1/2015 | Kim | H04W 74/002 |
| | | | 370/311 |
| 2015/0124776 A1* | 5/2015 | Lee | H04W 76/16 |
| | | | 370/331 |
| 2015/0139209 A1* | 5/2015 | Park | H04W 76/00 |
| | | | 370/338 |
| 2016/0088658 A1* | 3/2016 | Padden | H04W 28/0205 |
| | | | 370/338 |
| 2016/0227565 A1* | 8/2016 | Ghosh | H04L 5/0091 |
| 2017/0064708 A1* | 3/2017 | Noh | H04L 5/0023 |
| 2017/0303245 A1* | 10/2017 | Asterjadhi | H04L 43/0894 |
| 2017/0374681 A1* | 12/2017 | Kim | H04W 74/00 |
| 2018/0199271 A1* | 7/2018 | Viger | H04W 92/20 |
| 2018/0295567 A1* | 10/2018 | Ko | H04L 12/462 |
| 2018/0302922 A1* | 10/2018 | Patil | H04W 74/002 |
| 2019/0052353 A1* | 2/2019 | Kim | H04B 7/0452 |
| 2019/0313466 A1* | 10/2019 | Ko | H04W 72/51 |
| 2020/0037395 A1* | 1/2020 | Ko | H04W 80/08 |
| 2020/0120711 A1* | 4/2020 | Sevin | H04W 74/006 |
| 2021/0204324 A1* | 7/2021 | Viger | H04W 72/23 |
| 2022/0159731 A1* | 5/2022 | Viger | H04W 72/23 |
| 2022/0174742 A1* | 6/2022 | Sevin | H04L 5/0037 |
| 2022/0322426 A1* | 10/2022 | Viger | H04L 5/0023 |
| 2024/0040630 A1* | 2/2024 | Viger | H04W 72/23 |

\* cited by examiner

Fig. 5a
Fig. 5b
Fig. 5c

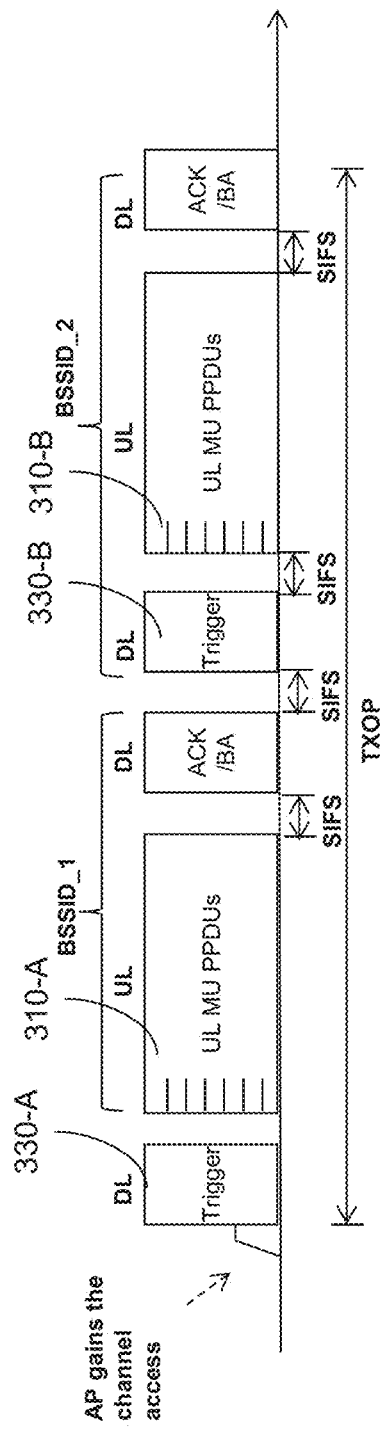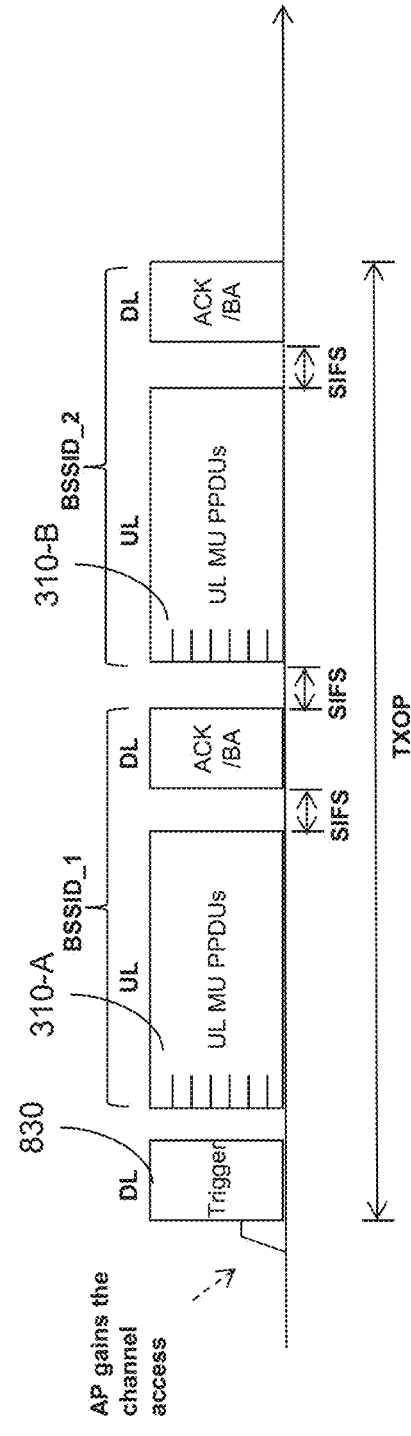

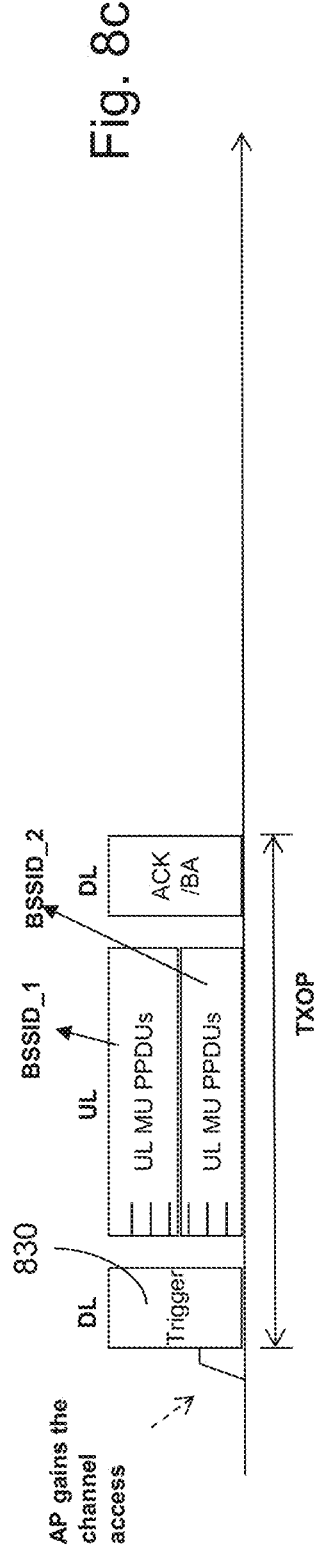

ACCESS TO RANDOM RESOURCE UNITS BY A PLURALITY OF BSSs

CROSS-REFERENCE TO RELATED APPLICATIONS

This application is a continuation of U.S. patent application Ser. No. 17/587,951, filed on Jan. 28, 2022, which is a continuation of U.S. patent application Ser. No. 16/081,399, filed on Aug. 30, 2018 and issued as U.S. Pat. No. 11,382,134 on Jul. 5, 2022, which is the National Phase application of PCT Application No. PCT/EP2017/055490, filed on Mar. 8, 2017, which claims the benefit under 35 U.S.C. § 119(a)-(d) of United Kingdom Patent Application No. 1604208.7, filed on Mar. 11, 2016 and entitled "IMPROVED ACCESS TO RANDOM RESOURCE UNITS BY A PLURALITY OF BSSs". The above cited patent applications are incorporated herein by reference in their entireties.

FIELD OF THE INVENTION

The present invention relates generally to communication networks and more specifically to the sending of data over a communication channel which is split into sub-channels (or Resource Units) that are available to groups of nodes associated with a respective plurality of network cells.

The invention finds application in wireless communication networks, in particular to the access of an 802.11ax composite channel and of OFDMA Resource Units forming for instance an 802.11ax composite channel for Uplink communication. One application of the method regards wireless data communication over a wireless communication network using Carrier Sense Multiple Access with Collision Avoidance (CSMA/CA), the network being accessible by a plurality of node devices.

BACKGROUND OF THE INVENTION

The IEEE 802.11 MAC standard defines the way Wireless local area networks (WLANs) must work at the physical and medium access control (MAC) level. Typically, the 802.11 MAC (Medium Access Control) operating mode implements the well-known Distributed Coordination Function (DCF) which relies on a contention-based mechanism based on the so-called "Carrier Sense Multiple Access with Collision Avoidance" (CSMA/CA) technique.

The 802.11 medium access protocol standard or operating mode is mainly directed to the management of communication nodes waiting for the wireless medium to become idle so as to try to access to the wireless medium.

The network operating mode defined by the IEEE 802.11ac standard provides very high throughput (VHT) by, among other means, moving from the 2.4 GHz band which is deemed to be highly susceptible to interference to the 5 GHz band, thereby allowing for wider frequency contiguous channels of to be used, two of which may optionally be combined to get a 160 MHz channel as operating band of the wireless network.

The 802.11ac standard also tweaks control frames such as the Request-To-Send (RTS) and Clear-To-Send (CTS) frames to allow for composite channels of varying and predefined bandwidths of 20, 40 or 80 MHz, the composite channels being made of one or more channels that are contiguous within the operating band. The 160 MHz composite channel is possible by the combination of two 80 MHz composite channels within the 160 MHz operating band. The control frames specify the channel width (bandwidth) for the targeted composite channel.

A composite channel therefore consists of a primary channel on which a given node performs EDCA backoff procedure to access the medium, and of at least one secondary channel, of for example 20 MHz each.

The primary channel is used by the communication nodes to sense whether or not the channel is idle, and the primary channel can be extended using the secondary channel or channels to form a composite channel.

Given a tree breakdown of the operating band into elementary channels, some secondary channels are named tertiary or quaternary channels.

In 802.11ac, all the transmissions, and thus the possible composite channels, include the primary channel. This is because the nodes perform full Carrier Sense Multiple Access/Collision Avoidance (CSMA/CA) and Network Allocation Vector (NAV) tracking on the primary channel only. The other channels are assigned as secondary channels, on which the nodes have only capability of CCA (clear channel assessment), i.e. detection of an idle or busy state/status of said secondary channel.

An issue with the use of composite channels as defined in the 802.11n or 802.11ac (or 802.11ax) is that the 802.11n and 802.11ac-compliant nodes (i.e. HT nodes standing for High Throughput nodes) and the other legacy nodes (i.e. non-HT nodes compliant only with for instance 802.11a/b/g) have to co-exist within the same wireless network and thus have to share the 20 MHz channels.

To cope with this issue, the 802.11n and 802.11ac standards provide the possibility to duplicate control frames (e.g. RTS/CTS or CTS-to-Self or ACK frames to acknowledge correct or erroneous reception of the sent data) on each channel in an 802.11a legacy format (called as "non-HT") to establish a protection of the requested TXOP (transmission opportunity) over the whole composite channel.

This is for any legacy 802.11a node that uses any of the 20 MHz channel involved in the composite channel to be aware of on-going communications on the 20 MHz channel. As a result, the legacy node is prevented from initiating a new transmission until the end of the current composite channel TXOP granted to an 802.11n/ac node.

As originally proposed by 802.11n, a duplication of conventional 802.11a or "non-HT" transmission is provided to allow the two identical 20 MHz non-HT control frames to be sent simultaneously on both the primary and secondary channels forming the used composite channel.

This approach has been widened for 802.11ac to allow duplication over the channels forming an 80 MHz or 160 MHz composite channel. In the remainder of the present document, the "duplicated non-HT frame" or "duplicated non-HT control frame" or "duplicated control frame" means that the node device duplicates the conventional or "non-HT" transmission of a given control frame over secondary 20 MHz channel(s) of the (40 MHz 80 MHz or 160 MHz) operating band.

In practice, to request a composite channel (equal to or greater than for a new TXOP, an 802.11n/ac node does an EDCA backoff procedure in the primary 20 MHz channel as mentioned above. In parallel, it performs a channel sensing mechanism, such as a Clear-Channel-Assessment (CCA) signal detection, on the secondary channels to detect the secondary channel or channels that are idle (channel state/status is "idle") during a PIFS interval before the start of the new TXOP (i.e. before any queue backoff counter expires).

More recently, Institute of Electrical and Electronics Engineers (IEEE) officially approved the 802.11ax task group, as the successor of 802.11ac. The primary goal of the 802.11ax task group consists in seeking for an improvement in data speed to wireless communicating devices used in dense deployment scenarios.

Recent developments in the 802.11ax standard sought to optimize usage of the composite channel by multiple nodes in a wireless network having an access point (AP). Indeed, typical contents have important amount of data, for instance related to high-definition audio-visual real-time and interactive content. Furthermore, it is well-known that the performance of the CSMA/CA protocol used in the IEEE 802.11 standard deteriorates rapidly as the number of nodes and the amount of traffic increase, i.e. in dense WLAN scenarios.

In this context, multi-user transmission has been considered to allow multiple simultaneous transmissions to/from different users in both downlink and uplink directions. In the uplink to the AP, multi-user transmissions can be used to mitigate the collision probability by allowing multiple nodes to simultaneously transmit.

To actually perform such multi-user transmission, it has been proposed to split a granted 20 MHz channel into sub-channels, also referred to as resource units (RUs), that are shared in the frequency domain by multiple users, based for instance on Orthogonal Frequency Division Multiple Access (OFDMA) technique. Each RU may be defined by a number of tones, the channel containing up to 242 usable tones.

OFDMA is a multi-user variation of OFDM which has emerged as a new key technology to improve efficiency in advanced infrastructure-based wireless networks. It combines OFDM on the physical layer with Frequency Division Multiple Access (FDMA) on the MAC layer, allowing different subcarriers to be assigned to different nodes in order to increase concurrency. Adjacent sub-carriers often experience similar channel conditions and are thus grouped to sub-channels: an OFDMA sub-channel or RU is thus a set of sub-carriers.

The multi-user feature of OFDMA allows the AP to assign different RUs to different nodes in order to increase competition. This may help to reduce contention and collisions inside 802.11 networks.

As currently envisaged, the granularity of such OFDMA sub-channels is finer than the original 20 MHz channel band. Typically, a 2 MHz or 5 MHz sub-channel may be contemplated as a minimal width, therefore defining for instance 9 sub-channels or resource units within a single 20 MHz channel.

To support multi-user uplink, i.e. uplink transmission to the 802.11ax access point (AP) during the granted TxOP, the 802.11ax AP has to provide signalling information for the legacy nodes (non-802.11ax nodes) to set their NAV and for the 802.11ax nodes to determine the allocation of the resource units RUs.

It has been proposed for the AP to send a trigger frame (TF) to the 802.11ax nodes to trigger uplink communications. The trigger frame is additional to other control (or signaling) messages sent by the AP, such beacon frames or probe messages defined in 802.11ax.

As widely known, the control frame stream is detrimental to network efficiency, in particular because, compared to exchange data, its bitrate is reduced. Thus its transmission time duration is longer than a same-sized data message.

The document IEEE 802.11-15/0365 proposes that a 'Trigger' frame (TF) is sent by the AP to solicit the transmission of uplink (UL) Multi-User (OFDMA) PPDU from multiple nodes. In response, the nodes transmit UL MU (OFDMA) PPDU as immediate responses to the Trigger frame. All transmitting nodes can send data at the same time, but using disjoint sets of RUs (i.e. of frequencies in the OFDMA scheme), resulting in transmissions with less interference.

The bandwidth or width of the targeted composite channel is signalled in the TF frame, meaning that the 20, 40, 80 or 160 MHz value is added. The TF frame is sent over the primary 20 MHz channel and duplicated (replicated) on each other 20 MHz channels forming the targeted composite channel, if appropriate. As described above for the duplication of control frames, it is expected that every nearby legacy node (non-HT or 802.11ac nodes) receiving the TF on its primary channel, then sets its NAV to the value specified in the TF frame. This prevents these legacy nodes from accessing the channels of the targeted composite channel during the TXOP.

A resource unit RU can be reserved for a specific node, in which case the AP indicates, in the TF, the node to which the RU is reserved. Such RU is called Scheduled RU. The indicated node does not need to perform contention on accessing a scheduled RU reserved to it.

In order to better improve the efficiency of the system in regards to un-managed traffic to the AP (for example, uplink management frames from associated nodes, unassociated nodes intending to reach an AP, or simply unmanaged data traffic), the document IEEE 802.11-15/0604 proposes a new trigger frame (TF-R) above the previous UL MU procedure, allowing random access onto the OFDMA TXOP. In other words, the resource unit RU can be randomly accessed by more than one node (of the group of nodes registered with the AP). Such RU is called Random RU and is indicated as such in the TF. Random RUs may serve as a basis for contention between nodes willing to access the communication medium for sending data.

The above is introduced with respect to a single group of nodes that is managed by the access point with which each node has previously registered. In the 802.11 standard, such a group of nodes together with the access point is known as a Basic Service Set (BSS). The access point acts as a master to control the nodes within the BSS. The simplest BSS consists of one access point and one node.

Each BSS is uniquely identified by a specific basic service set identification, BSSID. For a BSS operating in infrastructure mode, the specific BSSID is usually a 48-bit MAC address of the access point. The specific BSSID is the formal name of the BSS and is always associated with only one BSS.

Together with the specific BSSID, each BSS has its own service set identification, SSID, which is the informal (human) name of the BSS (since this own SSID identifier is often entered into devices manually by a human user).

In a BSS, the nodes usually contend for access to the communication medium as described above.

Recent developments provide that a single physical AP can operate as the master nodes of a plurality of BSSs, i.e. of a plurality of independent groups of nodes. This avoids using one physical AP per BSS or WLAN. It also makes it possible to use the same primary channel for all BSSs, thereby avoiding channel interference problems.

Such operating scheme where a plurality of BSSs is managed by the same physical AP is performed through so-called virtual access points (virtual APs or VAPs).

A Virtual AP is a logical entity that resides within a physical Access Point (AP). To a client, the VAP appears as an independent access point with its own unique SSID. To implement virtual APs, multiple BSSIDs are used with associated SSIDs. The BSSIDs for the VAPs in the physical AP are usually generated from a base BSSID specific to the underlying physical AP, usually the base MAC address of the AP.

The terms Virtual AP, specific BSSID, BSS and SSID can be used synonymously throughout this document, to designate a group or cell of nodes managed by a physical AP. Depending on the context, specific BSSID and own SSID may further refer to the identifier of a BSS/WLAN, either through a MAC address (specific BSSID) or an informal (human) name (own SSID).

Providing a plurality of SSIDs (or BSS) corresponds to providing various different networks in a particular area. It can give access to different resources and present services which may have differing management or security policies applied. This advantageously allows various categories of user, e.g. staff, students or visitors etc. to be provided with network services which are appropriate to them.

In conventional 802.11 approaches, only one SSID (or BSS) is advertised per signaling message such as a beacon frame. As a consequence, multiple beacons are used to advertise the SSIDs corresponding to the virtual APs configured at the physical AP. This solution is compatible with most 802.11 nodes and also allows the SSIDs to support different capability sets.

However, as the number of BSSs increases, more channel utilization results from such signaling. This downside is further increased because the signaling messages are transmitted at low bit rate, usually at the lowest supported data rate so that all clients can receive it.

In practice, each VAP sends a beacon frame every 100 ms.

To improve this situation of increased channel utilization in case of multiple BSSs, the IEEE 802.11v Wireless Network Management specification defines a mechanism to advertise multiple security profiles including BSSID/SSID advertisements, with a single beacon frame. This improvement is under consideration to be included in the 802.11ax draft.

However, the resulting network management is not satisfactory. In particular, the medium access for each BSS (for instance for uplink communication through trigger frames) is made independently of the other BSS. As a consequence, as the number of BSSs operating on a given channel increases, so does the amount of contention for data frames.

SUMMARY OF INVENTION

It is a broad objective of the present invention to improve this situation, i.e. to overcome some or all of the foregoing limitations. It is thus sought to provide an improved access to resource units in an 802.11 channel in case of multiple wireless networks (BSSs), in particular for uplink transmission in 802.11.

In this context, embodiments of the invention provide, from the access point's perspective, a wireless communication method in a wireless network comprising a physical access point and a plurality of nodes organized into groups (BSSs), each group being managed by a virtual access point implemented in the physical access point, the method comprising the following steps, at the physical access point:
    sending one trigger frame on the wireless network to reserve a transmission opportunity on at least one communication channel of the wireless network, the transmission opportunity including resource units that form the communication channel and that the nodes access to transmit data during the reserved transmission opportunity, the trigger frame identifying a plurality of groups, nodes of which are allowed (only) to access the resources units to transmit data; and
    in response to the trigger frame, receiving, over the resource units during the reserved transmission opportunity, data from one node of a first group identified in the trigger frame and data from one node (separate from the first one) of a second and separate group identified in the trigger frame.

From any node's perspective, these embodiments of the invention provide a wireless communication method in a wireless network comprising a physical access point and a plurality of nodes organized into groups (BSSs), each group being managed by a virtual access point implemented in the physical access point, the method comprising the following steps, at one node belonging to a first group:
    receiving a trigger frame from the physical access point over the wireless network, the trigger frame reserving a transmission opportunity on at least one communication channel of the wireless network, the transmission opportunity including resource units that form the communication channel and that the nodes access to transmit data during the reserved transmission opportunity, the trigger frame identifying a plurality of groups, nodes of which are allowed (only) to access the resources units to transmit data;
    determining whether said first group to which the node belongs corresponds to one of the groups identified in the received trigger frame or not; and
    only in case of positive determining, accessing at least one of the resource units during the transmission opportunity and transmitting data over the accessed resource unit to the physical access point.

Thanks to the invention, the nodes of various BSSs may transmit data (e.g. uplink to the AP) during the same reserved TxOP. A consequence is that the cost of the signaling (through trigger frames) is reduced, as the contention for the various BSSs is made only once.

This is achieved by the invention through the indication of a plurality of groups in the trigger frame used to contend for access the network. Indeed, the nodes of those groups are thus allowed to access the resource units provided during the reserved transmission opportunity.

Correlatively, the invention provides a communication device acting as a physical access point in a wireless network also comprising a plurality of nodes organized into groups (BSSs), each group being managed by a virtual access point implemented in the physical access point, the communication device acting as a physical access point comprising at least one microprocessor configured for carrying out the steps of:
    sending one trigger frame on the wireless network to reserve a transmission opportunity on at least one communication channel of the wireless network, the transmission opportunity including resource units that form the communication channel and that the nodes access to transmit data during the reserved transmission opportunity, the trigger frame identifying a plurality of groups, nodes of which are allowed (only) to access the resources units to transmit data; and
    in response to the trigger frame, receiving, over the resource units during the reserved transmission opportunity, data from one node of a first group identified in the trigger frame and data from one node (separate from the first one) of a second and separate group identified in the trigger frame.

From the node's perspective, the invention also provides a communication device in a wireless network comprising a physical access point and a plurality of nodes organized into groups (BSSs), each group being managed by a virtual access point implemented in the physical access point, the communication device being one node belonging to a first one of the groups and comprising at least one microprocessor configured for carrying out the steps of:

receiving a trigger frame from the physical access point over the wireless network, the trigger frame reserving a transmission opportunity on at least one communication channel of the wireless network, the transmission opportunity including resource units that form the communication channel and that the nodes access to transmit data during the reserved transmission opportunity, the trigger frame identifying a plurality of groups, nodes of which are allowed (only) to access the resources units to transmit data;

determining whether said first group to which the node belongs corresponds to one of the groups identified in the received trigger frame or not; and only in case of positive determining, accessing at least one of the resource units during the transmission opportunity and transmitting data over the accessed resource unit to the physical access point.

Optional features of embodiments of the invention are defined in the appended claims. Some of these features are explained here below with reference to a method, while they can be transposed into system features dedicated to any node device according to embodiments of the invention.

In embodiments where each group is uniquely identified by a specific basic service set identification, BSSID, derived from a base BSSID specific to the physical access point, the sent trigger frame includes the base BSSID, thus identifying the plurality of groups managed by the physical access point. From the node's perspective, the determining step includes comparing a BSSID included in the trigger frame with the base BSSID. This approach makes it possible for the AP to easily identify all the nodes it manages, while keeping compliance with the conventional fields in the header frame. Indeed, as the base BSSID may be a MAC address, it is compliant with the format of any address field in the header frame. Thus, the base BSSID may be specified in a transmitter or receiver address field in a header of the trigger frame.

Note that the base BSSID can be the base BSSID as defined in IEEE802.11v (48-bit MAC address of the physical AP known by all the nodes managed by the AP) or the modified base BSSID in which n LSBs are set to zero (n being a parameter defining for instance the maximum number of BSSs). Indeed, the modified base BSSID corresponds to an intermediary state during the derivation process deriving the base BSSID to obtain the specific BSSIDs for the BSSs. The modified base BSSID can thus also be seen as a base BSSID.

Of course, variants to the use of the base BSSID may be used, for instance an explicit list of specific BSSIDs. In some cases, these variants may require adapting the format of the trigger frame to mirror the format of how the plurality of groups is defined in the trigger frame. Also, the trigger frame may include a BSSID field to receive a BSSID, the BSSID field being made of bits, at least one bit of which defining whether the received BSSID is specific BSSID of a specific group of nodes or a multiple-BSS address. For instance, the base BSSID (indicated in the trigger frame) is a 48-bit MAC address of the physical access point, address in which at least one bit defines the received BSSID is a multiple-BSS address.

In alternative embodiments, the trigger frame includes (e.g. in addition to transmitter and receiver address fields defined below) at least one multi-BSS field, the multi-BSS field indicating whether the transmission opportunity provides resources units accessible by nodes of a plurality of groups to transmit data, or not. In other words, the multi-BSS field makes it possible to know whether or not the plurality of groups is defined in the trigger frame. One may see that in the embodiment above where the modified base BSSID (n LSBs are set to zero) is used, the n LSBs can be considered as a multi-BSS field. This is because all the possible specific BSSIDs cannot have their n LSBs set to zero.

According to a specific feature, each group is uniquely identified by a specific basic service set identification, BSSID, derived from a base BSSID specific to the physical access point, and the sent trigger frame includes a specific BSSID corresponding to a virtual access point sending the trigger frame. As explained below, the knowledge of the derivation process makes it possible to know, from the specific BSSID, which BSSs are identified by the trigger frame.

For a given node, it requires reading, from the received trigger frame, a multi-BSS field to determine whether the transmission opportunity provides resources units accessible by nodes of a plurality of groups to transmit data, or not. Thanks to this specific field, the node may quickly determine whether a current transmission opportunity is dedicated to a plurality of BSSs, including its own group.

According to another specific feature, each group is uniquely identified by a specific basic service set identification, BSSID, derived from a base BSSID specific to the physical access point, and the determining step includes reading a specific BSSID from the trigger frame, bit-masking the read specific BSSID, and comparing the masking result to a specific BSSID of the first group. A specific use of this approach is for the BSSID derivation process in which only the n LSBs of the base BSSID are modified. In that case the bit-masking may be performed on the 48-n MSBs between the read specific BSSID and the BSSID of the first group (the group to which the current node belongs). Indeed, the specific BSSIDs must have the same MSBs, due to the derivation process. Thus, if the bit-masking shows that the read specific BSSID and the BSSID of the first group have the same MSBs, the current node is concerned (the determining is positive).

In some embodiments from the node's perspective, in case of negative determining, the node does not access any resource unit during the reserved transmission opportunity. This is because the node belongs to a group which is not concerned by the received trigger frame. Usually, as the node is not an addressee of the trigger frame, it sets its NAV to a duration value specified in the trigger frame, and waits for this duration (i.e. duration of the transmission opportunity) before trying to start again a contention mechanism for accessing the communication channel.

In embodiments, the trigger frame includes a cascading field to indicate the reserved transmission opportunity is split into a plurality of successive time slots, each time slot providing resource units that the nodes access to transmit data. Thus, the node performs the following step: reading a cascading field in the trigger frame to determine whether the reserved transmission opportunity is split into a plurality of successive time slots or not, each time slot providing resource units that the nodes access to transmit data.

It is thus avoided for the AP to contend again for a new access to the channel in order to provide a new transmission time slot. As a consequence, one or more PIFS are avoided, and channel occupation due to signaling is substantially reduced.

Note that time slots define a time period during which each resource unit is accessed by a single node to transmit data. The time slots are separated one from the other by an interframe space (e.g. SIFS) and possibly by acknowledgment messages from the access point.

In first embodiments of the invention, the physical access point sends a trigger frame before each time slot to announce the time slot with associated resource units to the nodes. Thus the node performs the following step: receiving, from the physical access point and before each time slot, a trigger frame announcing the time slot with associated resource units.

Such trigger frames thus synchronize the nodes that are about to transmit on the various resource units.

Each time slot preceded by a trigger frame may thus be assigned to a given BSS. In that case for instance, each group is uniquely identified by a specific basic service set identification, BSSID, derived from a base BSSID specific to the physical access point and each trigger frame sent by the AP includes, in addition to the base BSSID to define the plurality of groups, one specific BSSID corresponding to a group of nodes to which the following time slot and associated resource units are reserved. Of course, a common BSSID value defining the plurality of BSSIDs may be used instead of the base BSSID, in addition to the specific BSSID.

This actually performs the assignment of a given time slot to a specific BSS. Thus, the node may perform the following steps: determining whether one of the trigger frames received during the reserved transmission opportunity includes, in addition to the base BSSID, a specific BSSID corresponding to the first group, or not;

and in case of positive determining, accessing at least one resource unit of the time slot following the determined trigger frame and transmitting data over the accessed resource unit to the physical access point.

In specific embodiments, the base BSSID and the specific BSSID are specified in one and the other of transmitter and receiver address fields in a header of the trigger frame, requiring that, from the node's perspective, the base BSSID and the specific BSSID are read from transmitter and receiver address fields in a header of the trigger frame.

These first embodiments advantageously keep compliancy with the TF format as currently defined in the 802.11 standard.

In second embodiments of the invention, the trigger frame includes a list of BSSIDs defining to which groups of nodes the successive time slots and associated resource units are respectively reserved. The BSSIDs are usually specific BSSIDs corresponding to respective groups of nodes (BSSs). However, a base or common BSSID corresponding to a plurality of groups can also be used in case it is desired to keep a time slot open to more nodes, for instance to all the nodes managed by the AP. Such approach is described with more details below.

From the node's perspective, this requires the following steps:
reading a list of BSSIDs from the trigger frame;
determining, based on the read list of BSSIDs, one of the time slots that is at least reserved to the first group (indeed a time slot may be reserved for a plurality of groups);
accessing at least one resource unit of the determined time slot and transmitting data over the accessed resource unit to the physical access point.

The second embodiments further decrease the cost of signaling, since trigger frames are no longer made necessary to offer a plurality of time slots with RUs to the nodes of different BSSs. As a consequence, channel occupation due to signaling is substantially reduced.

In some specific embodiments, an acknowledgment, sent by the physical access point, of data transmitted by nodes in a previous time slot triggers the start of a next time slot during the reserved transmission opportunity. Specific to the time slot the node may access, it means that the start of the determined time slot is triggered by an acknowledgment, sent by the physical access point, of data transmitted by nodes in a previous time slot during the reserved transmission opportunity. Note that the first time slot in the reserved transmission opportunity is, of course, triggered by the sent/received trigger frame.

According to a specific feature, the next time slot starts after a predefined time period (e.g. a SIFS) after the transmission of the acknowledgment by the physical access point. From the node's perspective, the determined time slot starts after a predefined time period (e.g. a SIFS) after the transmission of the acknowledgment by the physical access point.

In third embodiments, that can be combined with the second embodiments defined above, the reserved transmission opportunity includes resource units that are accessed simultaneously by the nodes (e.g. through OFDMA); and the trigger frame assigns at least a first resource unit and a second simultaneous resource unit to respectively a first group of nodes and a second and distinct group of nodes. It means for the node that it further determines a subset of the simultaneous resources units that is assigned to the first group to which the node belongs, and in case the subset is not empty (it may be made of one or more RUs), it accesses at least one resource unit of the determined subset and transmits data over the accessed resource unit to the physical access point.

The third embodiments provide bandwidth assignment at RU level. A fine and precise assignment of the bandwidth resources to the various BSSs can thus be achieved.

In specific embodiments, the number of simultaneous resource units assigned to each group of nodes depends on use statistics of use of resource units by each group in one or more previous transmission opportunities. Thus, the AP is able to finely tune the bandwidth resources to the BSSs as the network conditions evolve, depending for instance on which group needs bandwidth resources.

In embodiments, the trigger frame includes an indication of a duration of at least one timeslot within the reserved transmission opportunity to drive the nodes to end their transmissions during the at least one timeslot at the same time.

As explained below, while the convention Duration Field of the trigger frame may be used to set the total duration of the reserved TXOP, the "HE-SIG-A Info" field also provided in a trigger frame may be used to set the time duration of a (each) specific time slot.

To achieve some of the embodiments of the invention, for instance the second or third embodiments above, the trigger frame may have a specific structure, some examples of which are now described.

A multi-BSS field as described above may for instance be provided in the trigger frame.

According to a specific feature, the node further determines, based on the read multi-BSS field, a structure format of a per-BSS parameter section additional to transmitter and receiver address fields in the received trigger frame, a per-BSS parameter section defining an allocation of resource units to nodes of a single BSS. Indeed, different parameters (and thus structural fields) may be required depending on whether the multi BSS approach is used for the current transmission opportunity.

In some embodiments, the trigger frame includes, in addition to transmitter and receiver address fields, a parameter section including at least one cascading field, the cascading field indicating whether the transmission opportunity includes a plurality of successive time slots or not, each time slot providing resource units accessible by the nodes to transmit data.

Of course, the cascading field may be additional to the above multi-BSS field.

In some other embodiments from the AP's perspective, the trigger frame includes, in addition to transmitter and receiver address fields, a plurality of per-BSS parameter sections, at least current one (preferably each one) of the per-BSS parameter sections defining an allocation of resource units to nodes and including at least:
- one BSSID field identifying one or more groups of nodes concerned by the allocation,
- one timeslot field identifying a time slot concerned by the allocation, the reserved transmission opportunity being either made of one time slot or split into a plurality of time slots, each resource unit being accessed by a single node during a time slot to transmit data, one or more RU usage fields, each RU usage field identifying one or more resource units in the concerned time slot and one or more nodes of the concerned group or groups authorized to access the one or more identified resource units. For instance, a wildcard value may be used to identify and thus authorizing all the nodes of the concerned one or more groups to access the identified resource units.

This approach requires for a specific node to:
1) read, within the received trigger frame, a plurality of per-BSS parameter sections additional to transmitter and receiver address fields;
2) for at least one per-BSS parameter section defining an allocation of resource units to nodes:
    determine, based on one BSSID field included in the per-BSS parameter section, whether the first group is concerned by the allocation or not,
    determine, based on one timeslot field in the per-BSS parameter section, which time slot is concerned by the allocation, the reserved transmission opportunity being either made of one time slot or split into a plurality of time slots, each resource unit being accessed by a single node during a time slot to transmit data, and
    determine, based on one or more RU usage fields in the per-BSS parameter section, one or more resource units in the concerned time slot and whether said node is authorized to access the one or more determined resource units; and
3) in case the node is authorized to access the one or more determined resource units, access at least one of the determining resource units during the reserved transmission opportunity and transmit data over the accessed resource unit to the physical access point.

This specific structure for the trigger frame is quite close to the current format of the trigger frame, while allowing a very precise allocation of the RUs to be performed.

In some specific embodiments, each group is uniquely identified by a specific basic service set identification, BSSID, and a value in one of the BSSID fields is the specific BSSID of one group. Thus for the node specifically considered that accesses a resource unit, the read BSSID field includes the specific BSSID of the first group. This provision defines a resource allocation specific to a group of nodes.

In some variants, the specific BSSIDs of the groups derive from a base BSSID specific to the physical access point and a value in the BSSID field is the base BSSID so that all the groups of nodes are concerned by the allocation defined by the current per-BSS parameter section. For the node, it means that the read BSSID field includes the base BSSID. This provision defines a resource allocation open to all the nodes. This may advantageous be used when the AP desires to collect information from all the nodes, for instance to gather buffer status or history, to allow registration from nodes, etc. In that case, random resource units may advantageously be used since all the nodes can access them, depending on the result of a contention scheme.

According to a specific feature, the BSSID field is n-bit long, where n is the number of bits varying between the specific BSSIDs compared to the base BSSID. Reference to each group can be unambiguously made using the varying portion of their specific BSSIDs. This provision reduces the cost of indicating each specific BSSID in the trigger frame compared to the use of conventional BSSIDs (48-bit long). Better usage of the network bandwidth is thus obtained.

For instance, each group of nodes is associated with a n-bit BSS index uniquely identifying the groups, and the BSSID field is n-bit long receiving a n-bit BSS index associated with a specific group of nodes.

According to a variant, the BSSID field includes a bitmap, each bit in the bitmap being associated with a respective group of nodes. In addition, if a node belonging to the first group accesses a resource unit, it may mean that the bit (in the bitmap) associated with the first group is enabled so that the first group is concerned by the allocation.

In some embodiments, the trigger frame defines at least one resource unit that is accessible by any node from any one of two or more groups (preferably of all the groups). Such approach advantageously makes it possible for the AP to offer bandwidth resources to all the nodes at the same time, for instance to collect information from all the nodes whatever the BSSs (for instance to gather buffer status or history, to allow registration from nodes, etc.). A specific node thus determines, from the trigger frame, that at least one resource unit is accessible by any node from any one of two or more groups; and accesses this resource unit to transmit data to the physical access point.

To improve this situation, the trigger frame defines that all the resource units of at least one time slot are accessible by any node from any one of two or more groups, the reserved transmission opportunity being either made of one time slot or split into a plurality of time slots, each resource unit being accessed by a single node during a time slot to transmit data. From the node's perspective, it thus determines, from the trigger frame, that all the resource units of at least one time slot are accessible by any node from any one of two or more groups, the reserved transmission opportunity being either made of one time slot or split into a plurality of time slots, each resource unit being accessible by a single node during a time slot to transmit data.

To further improve this situation, the trigger frame defines that all the resource units in the reserved transmission opportunity are accessible by any node from any one of two or more groups. From the node's perspective, it thus determines, from the trigger frame, that all the resource units in the reserved transmission opportunity are accessible by any node from any one of two or more groups.

Another aspect of the invention relates to a wireless communication system having a physical access point and at least one communication device forming node as defined above.

Another aspect of the invention relates to a non-transitory computer-readable medium storing a program which, when executed by a microprocessor or computer system in a device of a communication network, causes the device to perform any method as defined above.

The non-transitory computer-readable medium may have features and advantages that are analogous to those set out above and below in relation to the methods and node devices.

Another aspect of the invention relates to a wireless communication method in a wireless network comprising a physical access point and a plurality of nodes organized into groups, substantially as herein described with reference to, and as shown in, FIG. 8a, or FIG. 8b, or FIG. 8c, or FIG. 10 of the accompanying drawings.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIGS. 5a, 5b and 5c present a first format of a Trigger frame;

FIGS. 8a, 8b and 8c illustrate exemplary embodiments of the invention for multiple BSS support with trigger Frame;

DETAILED DESCRIPTION

The invention will now be described by means of specific non-limiting exemplary embodiments and by reference to the figures.

Figure 1:
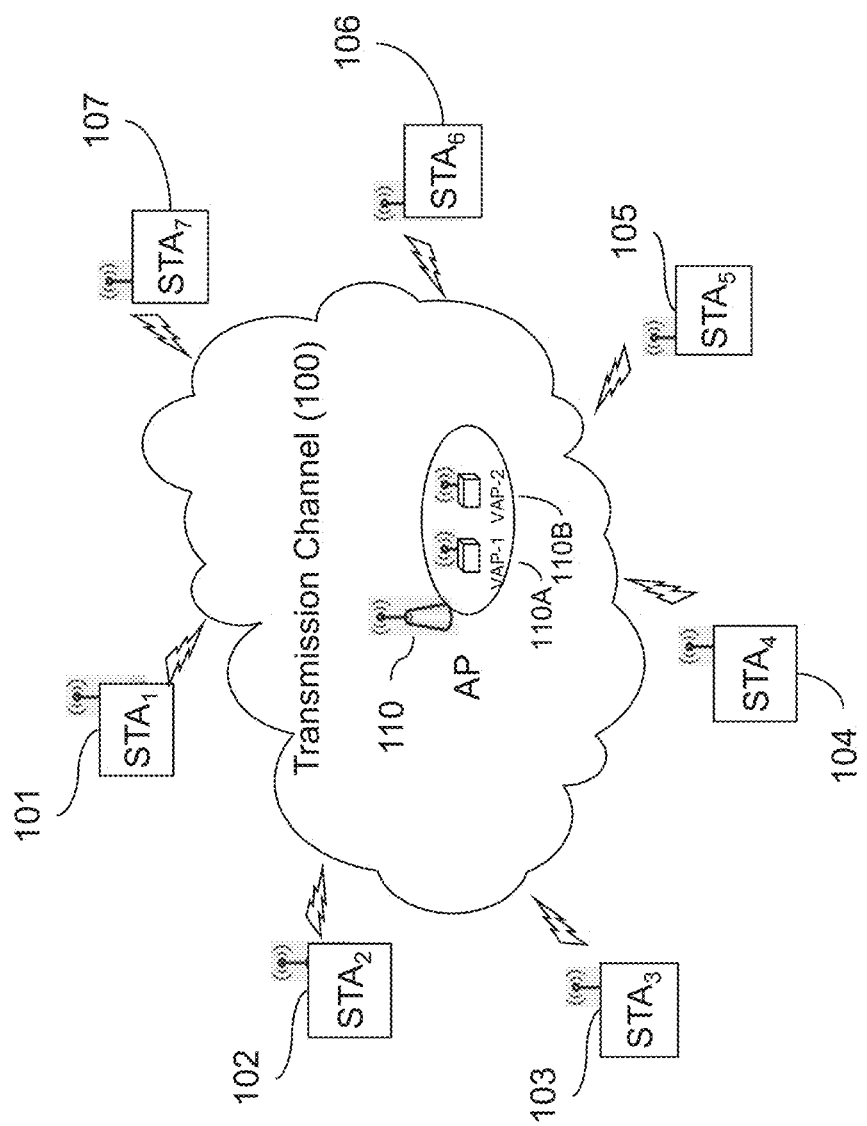
FIG. 1 illustrates a typical wireless communication system in which embodiments of the invention may be implemented.

FIG. 1 illustrates a communication system in which several communication nodes (or stations) 101-107 exchange data frames over a radio transmission channel 100 of a wireless local area network (WLAN), under the management of a central station, or access point (AP) 110. The radio transmission channel 100 is defined by an operating frequency band constituted by a single channel or a plurality of channels forming a composite channel.

Access to the shared radio medium to send data frames is based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a source or transmitting node first attempts through the physical mechanism, to sense a medium that has been idle for at least one DIFS (standing for DCF InterFrame Spacing) time period, before transmitting data frames.

However, if it is sensed that the shared radio medium is busy during the DIFS period, the source node continues to wait until the radio medium becomes idle.

To access the medium, the node starts a countdown backoff counter designed to expire after a number of timeslots, chosen randomly in the contention window range [0, CW], CW (integer) being also referred to as the Contention Window size and defining the upper boundary of the backoff selection interval (contention window range). This backoff mechanism or procedure is the basis of the collision avoidance mechanism that defers the transmission time for a random interval, thus reducing the probability of collisions on the shared channel. After the backoff time period, the source node may send data or control frames if the medium is idle.

One problem of wireless data communications is that it is not possible for the source node to listen while sending, thus preventing the source node from detecting data corruption due to channel fading or interference or collision phenomena. A source node remains unaware of the corruption of the data frames sent and continues to transmit the frames unnecessarily, thus wasting access time.

The Collision Avoidance mechanism of CSMA/CA thus provides positive acknowledgement (ACK) of the sent data frames by the receiving node if the frames are received with success, to notify the source node that no corruption of the sent data frames occurred.

The ACK is transmitted at the end of reception of the data frame, immediately after a period of time called Short InterFrame Space (SIFS).

If the source node does not receive the ACK within a specified ACK timeout or detects the transmission of a different frame on the channel, it may infer data frame loss. In that case, it generally reschedules the frame transmission according to the above-mentioned backoff procedure.

The wireless communication system of FIG. 1 comprises a physical access point 110 configured to manage two or more WLANs (or BSSs), i.e. two or more groups of nodes. Each BSS is uniquely identified by a specific basic service set identification, BSSID and managed by a virtual AP implemented in the physical AP.

In the example shown, the physical AP implements two virtual APs, virtual AP 1 (100A) having MAC address MAC1 as specific BSSID to manage a first WLAN (BSS), and virtual AP 2 (100B) having MAC address MAC2 as specific BSSID to manage a second WLAN (BSS). Of course more WLANs can be implemented, requiring a corresponding number of virtual APs to be implemented in the physical AP.

All MAC addresses for the virtual APs are generated based on (or "derive from") a base MAC address specific to the physical access point, usually the base 48-bit MAC address of AP 110. For instance $MAC_i$ ('i' being a BSS index) used as specific BSSID(i) for virtual $AP_i$ is generated as follows, from the base MAC address BASE_BSSID:

$MAC_i$=BSSID($i$)=(BASE_BSSID modified to set the
$n$ LSBs to zero)|(($n$ LSBs of BASE_BSSID)+$i$)
mod $2^n$)

where LSB refers to the least significant bits, "n" is an AP parameter (integer) defining the maximum number (about $2^n$) of possible specific BSSIDs, and '|' operator is an XOR operator. The specific BSSID(i) thus differ one from the other by their n LSBs. The 48-n MSBs of the generated specific BSSIDs are all similar to the corresponding bits of BASE_BSSID.

As an example, virtual AP 1 provides a WLAN with "guest" as SSID that one or more nodes can join, while virtual AP 2 provides a WLAN with "Employee" as SSID that other nodes can join simultaneously. The security for each WLAN is different, i.e. WEP and WPA. A same device can usually join two WLANs simultaneously if it has two separate WLAN interfaces (e.g. wifi network card). In that case, the device is considered as two nodes in the network, each node being able to join only one WLAN at a time.

Some control frames sent by the AP are an important part of 802.11, for instance beacon frames and probe response frames. The nodes are waiting for these frames to know about the WLANs or BSSs available.

These frames let the nodes know that an AP and one or more WLANs are available, but also notify the nodes about important information such as the corresponding SSID or SSIDs, the corresponding specific BSSID or BSSIDs, the communication mode (Infrastructure or Ad-Hoc), the protection security schemes used (e.g. Open, WEP, WPA-PSK or 802.1X), the support transmission rates used, the channel in operation and optional Information Elements.

When multiple BSSs are provided, multiple beacons are transmitted by the AP, one for each active BSS, usually each 100 ms. It results in that the nodes have to process beacon frames more frequently and that channel occupation due to control frames is increased (being noted that the control frames such as the beacon frames are transmitted at low rate).

These drawbacks can be reduced by for example increasing the beacon interval (more than 100 ms) so that the beacon frame of each BSS is sent less frequently. However, this may cause some nodes not to detect the beacon frame of a given BSS when scanning, and thus to decide a particular BSS (through its SSID) is not available.

To improve this situation, the IEEE 802.11v Wireless Network Management specification provides a mechanism to advertise multiple security profiles including BSSID advertisements. Thus, a single Beacon frame is sent rather than multiple Beacon frames in order to advertise a plurality of specific BSSIDs/SSIDs. In this mechanism, a new Information Element (IE) is defined (Multiple BSSID IE) in the beacon frames sent by one or the other of the multiple virtual APs (i.e. specific BSSIDs).

The transmitter address of such a beacon frame includes the specific BSSID of the transmitting virtual AP. Furthermore, the Multiple BSSID IE indicates that multiple BSSs is contemplated and provides an indication of the maximum number of BSSs, parameter "n", to the nodes, as well as the common, inherited information element values of all of the BSSs (e.g. so that all members of the set use a common operating class, channel, channel access functions, etc.) and the unique information elements of each of the other BSSs indexed by their BSSID indexes 'i' (i.e. different advertised capabilities of the various BSSs, including ones from the BSS of the transmitting VAP).

As mentioned above, a BSSID index 'i' is a value between 1 and $2^n-1$, which identifies the BSSID. It may also be noted that the AP may include two or more Multiple BSSID elements containing elements for a given BSSID index in one Beacon frame.

Such a multi BSS beacon frame may also transmit the base address BASE_BSSID to the nodes.

Figure 2:
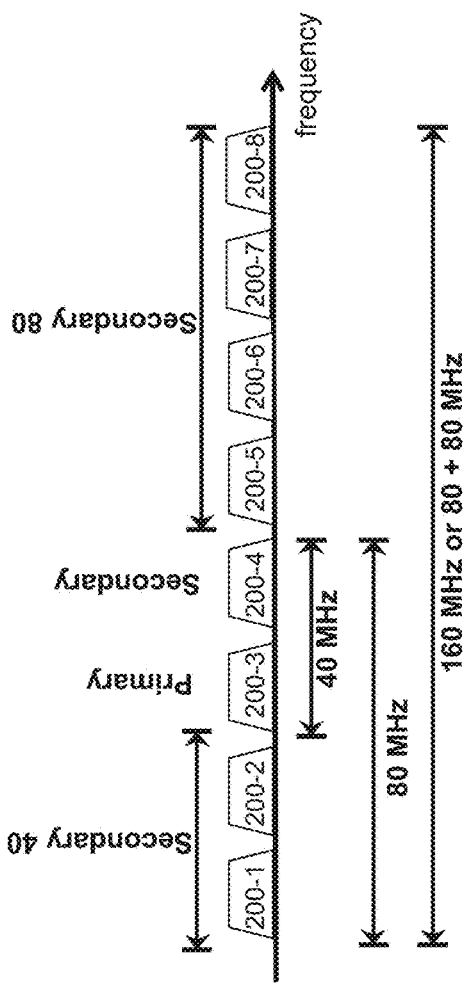
FIG. 2 illustrates 802.11ac channel allocation that support channel bandwidth of 20 MHz, 40 MHz, 80 MHz or 160 MHz as known in the art.

To meet the ever-increasing demand for faster wireless networks to support bandwidth-intensive applications, 802.11ac is targeting larger bandwidth transmission through multi-channel operations. FIG. 2 illustrates 802.11ac channel allocation that support composite channel bandwidth of 20 MHz, 40 MHz, 80 MHz or 160 MHz IEEE 802.11ac introduces support of a restricted number of predefined subsets of 20 MHz channels to form the sole predefined composite channel configurations that are available for reservation by any 802.11ac node on the wireless network to transmit data.

The predefined subsets are shown in the Figure and correspond to 20 MHz, 40 MHz, 80 MHz, and 160 MHz channel bandwidths, compared to only 20 MHz and 40 MHz supported by 802.11n. Indeed, the 20 MHz component channels 200-1 to 200-8 are concatenated to form wider communication composite channels.

In the 802.11ac standard, the channels of each predefined 40 MHz, or 160 MHz subset are contiguous within the operating frequency band, i.e. no hole (missing channel) in the composite channel as ordered in the operating frequency band is allowed.

The 160 MHz channel bandwidth is composed of two 80 MHz channels that may or may not be frequency contiguous. The 80 MHz and 40 MHz channels are respectively composed of two frequency adjacent or contiguous 40 MHz and 20 MHz channels, respectively. However the present invention may have embodiments with either composition of the channel bandwidth, i.e. including only contiguous channels or formed of non-contiguous channels within the operating band.

A node (including the AP) is granted a TxOP through the enhanced distributed channel access (EDCA) mechanism on the "primary channel" (200-3). Indeed, for each composite channel having a bandwidth, 802.11ac designates one channel as "primary" meaning that it is used for contending for access to the composite channel. The primary 20 MHz channel is common to all nodes (STAs) belonging to the same basic set, i.e. managed by or registered to the same local Access Point (AP).

However, to make sure that no other legacy node (i.e. not belonging to the same set) uses the secondary channels, it is provided that the control frames (e.g. RTS frame/CTS frame or trigger frame described below) reserving the composite channel are duplicated over each 20 MHz channel of such composite channel.

As addressed earlier, the IEEE 802.11ac standard enables up to four, or even eight, 20 MHz channels to be bound. Because of the limited number of channels (19 in the 5 GHz band in Europe), channel saturation becomes problematic. Indeed, in densely populated areas, the 5 GHz band will surely tend to saturate even with a 20 or 40 MHz bandwidth usage per Wireless-LAN cell.

Developments in the 802.11ax standard seek to enhance efficiency and usage of the wireless channel for dense environments.

In this perspective, one may consider multi-user transmission features, allowing multiple simultaneous transmissions to different users in both downlink and uplink directions, once a transmission opportunity has been reserved. In the uplink, multi-user transmissions can be used to mitigate the collision probability by allowing multiple nodes to simultaneously transmit.

To actually perform such multi-user transmission, it has been proposed to split a granted 20 MHz channel (200-1 to 200-4) into sub-channels 310 (elementary sub-channels), also referred to as sub-carriers or resource units (RUs), that are shared in the frequency domain by multiple users, based for instance on Orthogonal Frequency Division Multiple Access (OFDMA) technique.

This is illustrated with reference to FIG. 3.

The multi-user feature of OFDMA allows the AP to assign different RUs to different nodes in order to increase competition within a reserved transmission opportunity TXOP. This may help to reduce contention and collisions inside 802.11 networks.

Contrary to downlink OFDMA wherein the AP can directly send multiple data to multiple stations (supported by specific indications inside the PLCP header), a trigger mechanism has been adopted for the AP to trigger uplink communications from various nodes.

To support an uplink multi-user transmission (during a pre-empted TxOP), the 802.11ax AP has to provide signalling information for both legacy stations (non-802.11ax nodes) to set their NAV and for 802.11ax nodes to determine the Resource Units allocation.

In the following description, the term legacy refers to non-802.11ax nodes, meaning 802.11 nodes of previous technologies that do not support OFDMA communications.

Figure 3:
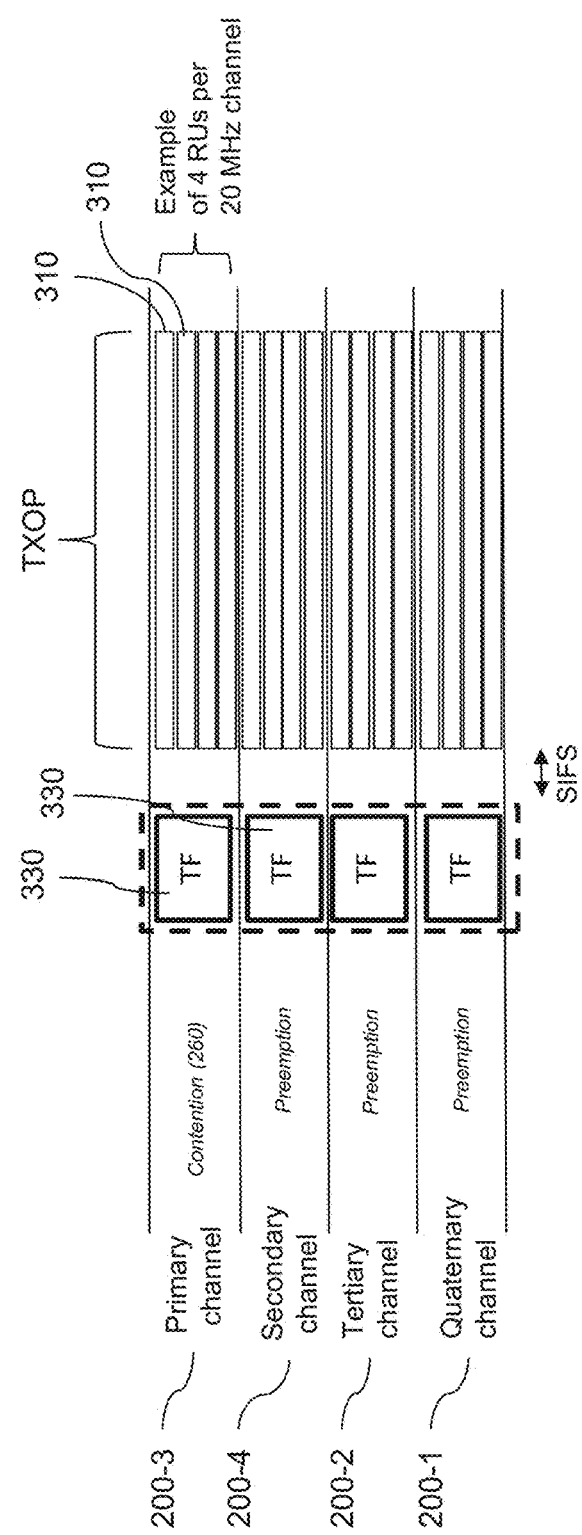
FIG. 3 illustrates an example of 802.11ax uplink OFDMA transmission scheme, wherein the AP issues a Trigger Frame for reserving a transmission opportunity of OFDMA sub-channels (resource units) on an 80 MHz channel as known in the art.

As shown in the example of FIG. 3, the AP sends a trigger frame (TF) 330 to the targeted 802.11ax nodes to reserve a transmission opportunity. The bandwidth or width of the targeted composite channel for the transmission opportunity is signalled in the TF frame, meaning that the 20, 40, 80 or 160 MHz value is added. The TF frame is a control frame, according the 802.11 legacy non-HT format, and is sent over the primary 20 MHz channel and duplicated (replicated) on each other 20 MHz channels forming the targeted composite channel. As described above for the duplication of control frames, it is expected that every nearby legacy node (non-HT or 802.11ac nodes) receiving the TF on its primary channel, then sets its NAV to the value specified in the TF frame. This prevents these legacy nodes from accessing the channels of the targeted composite channel during the TXOP.

Based on an AP's decision, the trigger frame TF may define a plurality of resource units (RUs) 310, or "Random RUs", which can be randomly accessed by the nodes of the network. In other words, Random RUs designated or allocated by the AP in the TF may serve as basis for contention between nodes willing to access the communication medium for sending/uploading data during the reserved transmission opportunity. A collision occurs when two or more nodes attempt to transmit at the same time over the same RU.

A trigger frame that can be randomly accessed is referred to as a trigger frame for random access (TF-R). A TF-R may be emitted by the AP to allow multiple nodes to perform UL MU (UpLink Multi-User) random access to obtain an RU for their UL transmissions.

The trigger frame TF may also designate Scheduled resource units, in addition or in replacement of the Random RUs. Scheduled RUs may be reserved by the AP for certain nodes in which case no contention for accessing such RUs is needed for these nodes. Such RUs and their corresponding scheduled nodes are indicated in the trigger frame. For instance, a node identifier, such as the Association ID (AID) assigned to each node upon registration, is added in association with each Scheduled RU in order to explicitly indicate the node that is allowed to use each Scheduled RU.

An AID equal to 0 may be used to identify random RUs.

The multi-user feature of OFDMA allows the AP to assign different RUs to different nodes in order to increase competition. This may help to reduce contention and collisions inside 802.11 networks.

In the example of FIG. 3, each 20 MHz channel (200-1, 200-2, 200-3 or 200-4) is sub-divided in frequency domain into four sub-channels or RUs 310, typically of size 5 Mhz.

Of course the number of RUs splitting a 20 MHz channel may be different from four. For instance, between two to nine RUs may be provided (thus each having a size between 10 MHz and about 2 MHz).

Once the nodes have used the RUs to transmit data to the AP, the AP responds with an acknowledgment frame (not show in the Figure) to acknowledge the data received. As for the other control frames, the acknowledgment frame is duplicated over each 20 MHz channel of such composite channel. Preferably, the acknowledgment frame performs a block acknowledgment, meaning that it acknowledges simultaneously reception of data transmitted over a plurality (e.g. all) of the RUs.

The trigger frame thus defines resource units including a plurality of (random and/or scheduled) resource units that the nodes can access. As currently designed, a trigger frame is specific to a single BSS, meaning that only the nodes belonging to that specific BSS are allowed to access the resource units included in the transmission opportunity reserved by the trigger frame. For instance, the BSSID of the BSS considered (i.e. the MAC address of the virtual AP) is set in the transmitter address field of the header of the trigger frame.

Figures 5A, 5B, 5C:
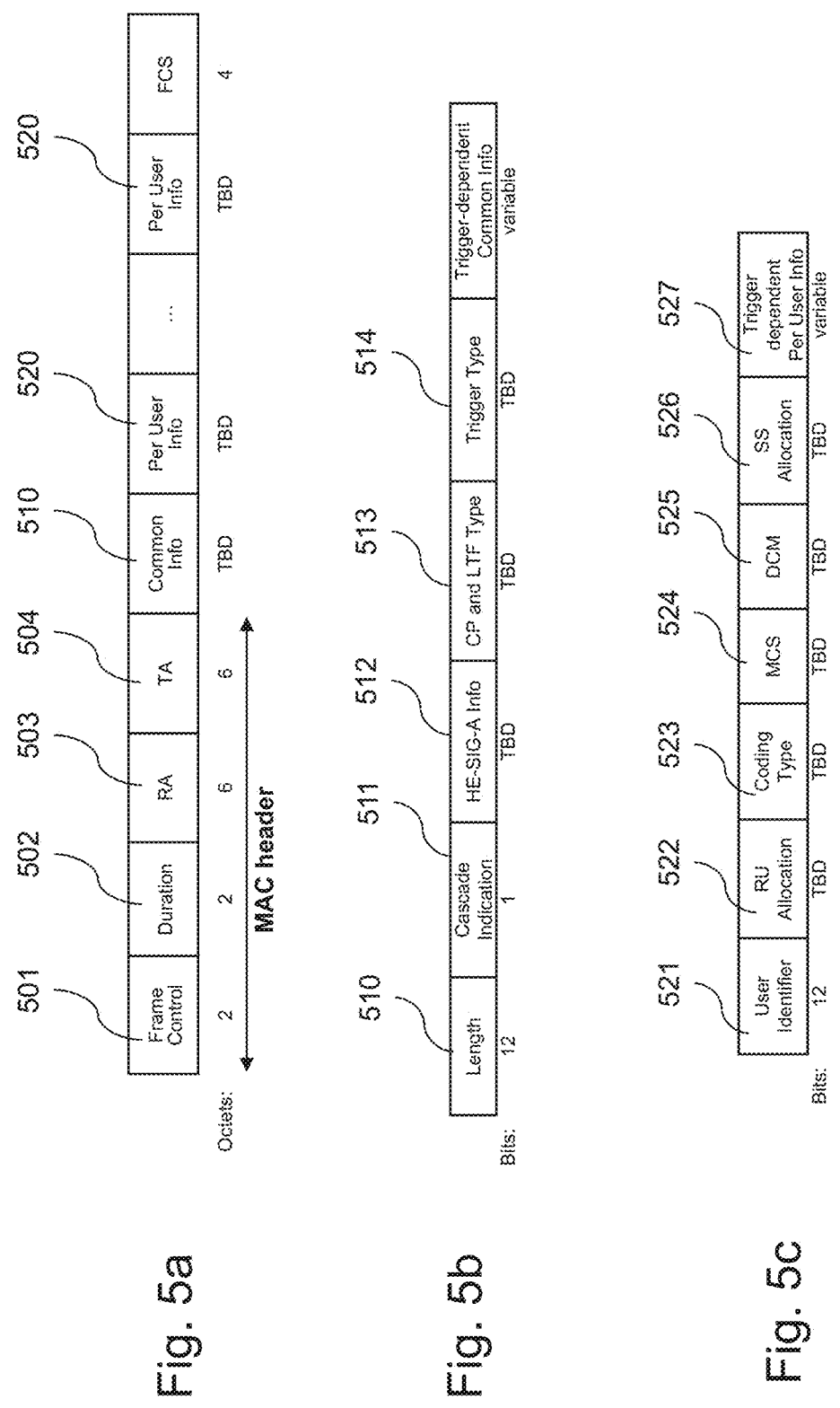

FIG. 5*a* presents the MAC format of the trigger frame 330 according to the 802.11ax standard.

The Trigger frame is used to allocate (random and/or scheduled) resource units for UL MU transmission by 802.11ax nodes. The trigger frame is duplicated in each 20 MHz of the targeted composite channel to reserve a transmission opportunity over the composite channel. The trigger frame follows the legacy format of control frames (no specific HT preamble).

The TF 330 is made up of a MAC header and of additional fields. The MAC header includes the following fields common to all control frames: a frame control field 501, a duration field 502, a RA (Receiver Address) field 503, a TA (Transmitter Address) field 504. The additional fields, specific to the trigger frame, include a data portion formed of information fields (510 and 520) specific to the TF, and a CRC/FCS (Cyclic Redundancy Check, or Frame Check Sequence, or also called checksum) field. The CRC/FCS field may optionally be preceded by a padding field of variable size (not shown in the figure), for considerations out of scope of the present invention.

The Duration field 502 is set to the estimated time, in microseconds, required for the pending uplink transmissions, and is used to set the NAV of nodes not targeted by the RA field 503. This Duration field 502 thus sets the expected duration for the solicited transmission opportunity TXOP.

The RA field 503 is set to the address of the recipient node or nodes. As a Trigger frame is intended for a group of nodes (a BSS), the standard provides not specifying it at the time being to infer broadcasting. The inventors propose, as an exemplary implementation, to use the wildcard MAC address (FF:FF:FF:FF:FF:FF) as a broadcast indication.

The TA field 504 is set to the address of the node transmitting the Trigger frame; it is typically the MAC address of the AP which sends the TF. When the AP hosts several virtual APs for multiple BSSs, the MAC address of the current BSS (i.e. the specific BSSID or MAC address of the virtual AP concerned) is used for the TA field 504.

As the TF is dedicated to a single BSS, through the specific BSSID set in the TA field 504, the physical AP has to send successively a plurality of trigger frames if it wants to provide respective transmission opportunities (with resource units) to various BSSs.

Figure 4:
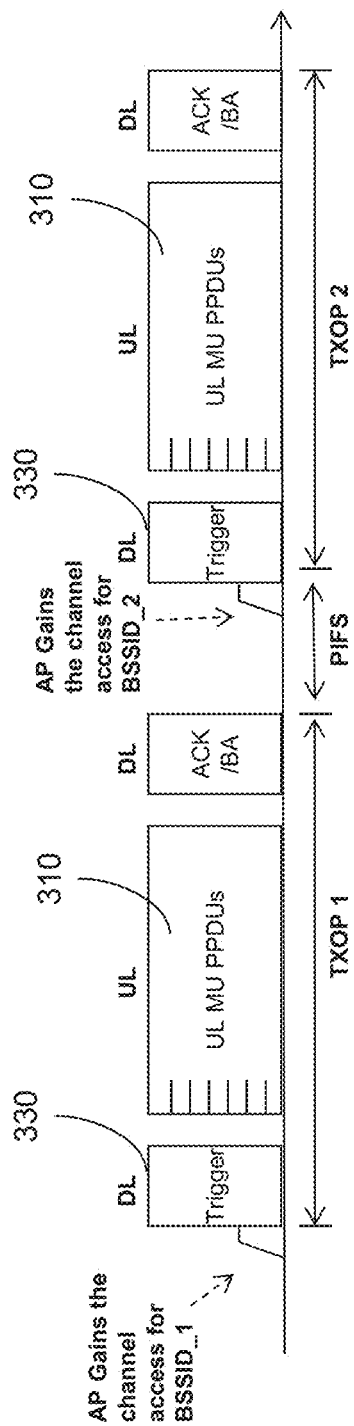
FIG. 4 illustrates how an AP can poll two distinct BSSs using trigger frames.

FIG. 4 illustrates how the Access Point can poll two distinct BSSs. This can be useful if the AP wants to successively query nodes of distinct BSSs for management matter (like buffer report).

The AP has to send two separate trigger frames for polling two BSSs.

The AP gains priority access to the communication medium (at least after a PIFS time period with an idle medium, which is less than the DIFS duration necessary for the nodes managed by the AP to start a new contention procedure), so that it can send a first TF to reserve a first transmission opportunity TXOP 1 for a first BSS, BSS 1. During TXOP 1, the nodes of BSS 1 can access the RUs and upload their data, while the AP acknowledges the reception thereof (ACK/BA in the Figure).

Next, the AP relaxes the communication medium but immediately (after PIFS) obtains priority again for access to the communication medium to send another and second TF to reserve a second transmission opportunity TXOP 2 for a second BSS, BSS 2.

During TXOP 2, the nodes of BSS 2 can access the RUs and upload their data.

In the approach of FIG. 4, the wireless network comprising a physical access point and a plurality of nodes organized into groups, each group being managed by a virtual access point implemented in the physical access point. The nodes contend for an access to the wireless network, and the contention process at each node starts or restarts once the wireless network is detected as idle for a predefined time period (usually DIFS time period after the end of a previous TXOP, for instance after an acknowledgment from the AP or after end of PPDU transmission).

The physical access point thus performs the step of sending a plurality of trigger frames on the wireless network to reserve successive transmission opportunities on at least one communication channel of the wireless network, each transmission opportunity being reserved for a specific group of nodes and including resource units that form the communication channel and that the nodes of the specific group access to transmit data. Typically, a next trigger frame is sent after a time period (e.g. PIFS) following a previous reserved transmission opportunity, the time period being less that the predefined time period (defining nodes' contention for access to the network, e.g. DIFS).

During the time period (PIFS), the network is detected as idle because no node has restarted its contention mechanism and thus no node can access the network in the meantime.

Consequently, the physical access point receives, in response to each trigger frame and during the corresponding reserved transmission opportunity, data from one or more nodes of the group specific to the trigger frame.

One advantage of the approach of FIG. 4 is that the nodes perform a conventional processing.

The AP thus performs several TXOP reservations according to the number of BSSs it wants to poll. Each reserved TXOP is independent from one another, in particular because the nodes not addressed by the trigger frame set their NAV to the Duration Field 502, and thus waits for this duration.

The intention of the AP to send successive trigger frames using the above priority (possibility to wait only a single first PIFS duration) may be specified in the trigger frame using a Cascade Indication, so that the nodes not addressed by the first frame can listen to detect the second trigger frame. Nevertheless, this cascading is limited to nodes of a same BSS according to the current specification of the standard.

FIG. 5b illustrates Common Info field 510 forming part of the additional fields in the TF 330.

It includes a Cascade Indication subfield 511 to indicate the successive trigger frames. For instance, subfield 511 is to 0 when a subsequent Trigger frame will follow the current Trigger frame. Otherwise, the Cascade Indication subfield is set to 0.

Common Info field 510 also includes a Trigger Type subfield 514 to indicate the type of the Trigger frame.

The other subfields in Common Info field 510 are of less importance for the present invention (Length, HE-SIG-A Info, CP and LTF Type subfields indicate some parameters to format the HE trigger-based PPDU response, that is to say the uplink multi-user OFDMA frame).

FIG. 5c illustrates Per User Info field 520 also forming part of the additional fields in the TF 330. The Per User Info field 520 defines the allocation of one or more resource units to nodes of the BSS addressed in TA field 504. A plurality of Per User Info fields 520 is usually used to define the allocation of all the resource units of the transmission opportunity.

User Identifier subfield 521 contains the 12 LSBs of the Association IDentifier (AID) of the node(s) to which the RU identified in RU Allocation field 522 is allocated, to transmit the MPDU(s) in the uplink direction.

The AID is a 16-bit unique value assigned to a node by the AP during association handshake, i.e. during registration. The values other than 1-2007 (0 and 2008-65535) are reserved, limiting the number of nodes for an AP to 2007. This is why using the 12 LSBs is sufficient. In particular, AID=0 is reserved for assigning the group of nodes forming the BSS currently addressed (TA Field 504).

The AID management is performed per each virtual AP (i.e. per BSS).

As mentioned above, RU Allocation subfield 522 indicates the RU or RUs that are allocated to the one or more nodes identified in User Identifier subfield 521. The length and coding of RU Allocation subfield are not defined yet, but an index of ordered RUs may be used.

The other fields of Per User Info field 520 are of less importance for the present invention.

The present invention seeks to provide a more efficient usage of the bandwidth in case of multiple BBSs.

The inventors have contemplated reducing the cost of signaling, in particular regarding the trigger frames. To do so, they propose allowing nodes from various BSSs to be triggered for uplink communication, within a single channel access, i.e. during the same reserved transmission opportunity.

Thanks to the use of a same transmission opportunity, trigger frames can be avoided and/or any new trigger frame during the already reserved transmission opportunity can be sent earlier. Thus occupation of the channel due to the trigger frames is reduced and/or lost waiting time before sending a new trigger frame is also reduced.

Various embodiments are proposed below that all relate to a wireless communication method in a wireless network comprising a physical access point and a plurality of nodes organized into groups (BSSs), each group being managed by a virtual access point implemented in the physical access point and being uniquely identified by a specific basic service set identification, BSSID, the method comprising the following steps, at the physical access point:
  sending one trigger frame on the wireless network to reserve a transmission opportunity on at least one communication channel of the wireless network, the transmission opportunity including resource units that form the communication channel and that the nodes access to transmit data during the reserved transmission opportunity, the trigger frame identifying a plurality of groups, nodes of which are allowed (only) to access the resources units to transmit data; and
  in response to the trigger frame, receiving, over the resource units during the reserved transmission opportunity, data from one node of a first group identified in the trigger frame and data from one node (separate from the first one) of a second and separate group identified in the trigger frame.

Any node belonging to a group, called "first group", and receiving such trigger frame thus determines whether said first group to which the node belongs corresponds to one of the groups identified in the received trigger frame or not; and
  only in case of positive determining, accesses at least one of the resource units during the transmission opportunity and transmits data over the accessed resource unit to the physical access point.

Figure 6:
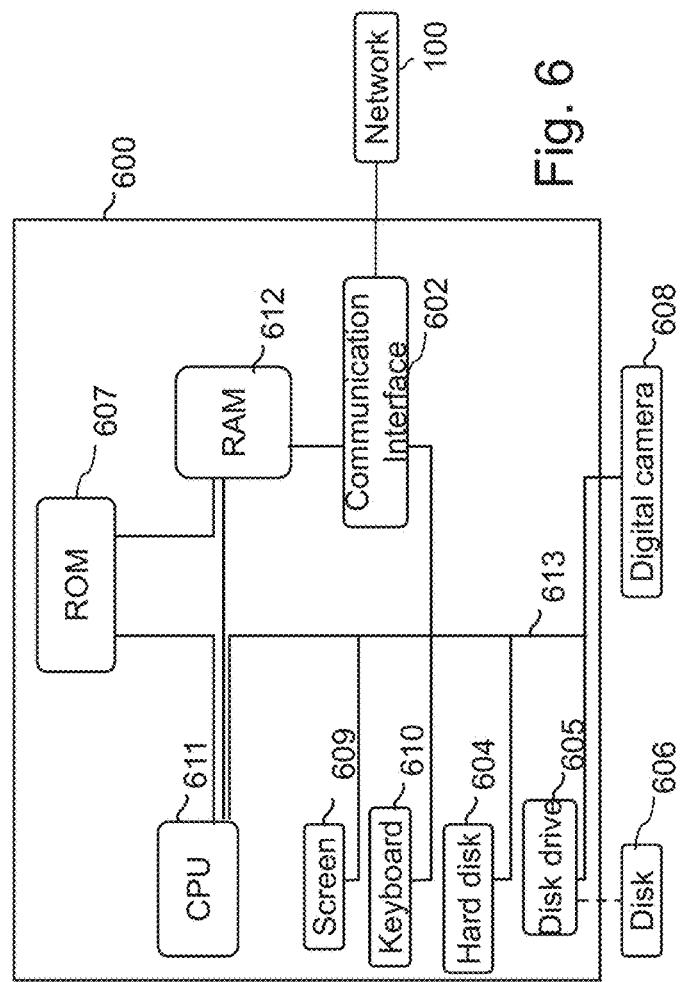
FIG. 6 shows a schematic representation a communication device or station in accordance with embodiments of the present invention.

FIG. 6 schematically illustrates a communication device 600, either a node 101-107 or the access point 110, of the radio network 100, configured to implement at least one embodiment of the present invention. The communication device 600 may preferably be a device such as a microcomputer, a workstation or a light portable device. The communication device 600 comprises a communication bus 613 to which there are preferably connected:
  a central processing unit 611, such as a microprocessor, denoted CPU;
  a read only memory 607, denoted ROM, for storing computer programs for implementing the invention;
  a random access memory 612, denoted RAM, for storing the executable code of methods according to embodiments of the invention as well as the registers adapted to record variables and parameters necessary for implementing methods according to embodiments of the invention; and
  at least one communication interface 602 connected to the radio communication network 100 over which digital data packets or frames or control frames are transmitted, for example a wireless communication network according to the 802.11ax protocol. The frames are written from a FIFO sending memory in RAM 612 to the network interface for transmission or are read from the network interface for reception and writing into a FIFO receiving memory in RAM 612 under the control of a software application running in the CPU 611.

Optionally, the communication device 600 may also include the following components:
  a data storage means 604 such as a hard disk, for storing computer programs for implementing methods according to one or more embodiments of the invention;
  a disk drive 605 for a disk 606, the disk drive being adapted to read data from the disk 606 or to write data onto said disk;
  a screen 609 for displaying decoded data and/or serving as a graphical interface with the user, by means of a keyboard 610 or any other pointing means.

The communication device 600 may be optionally connected to various peripherals, such as for example a digital camera 608, each being connected to an input/output card (not shown) so as to supply data to the communication device 600.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 607, on the hard disk 604 or on a removable digital medium such as for example a disk 606 as described previously. According to an optional variant, the executable code of the programs can be received by means of the communication network 603, via the interface 602, in order to be stored in one of the storage means of the communication device 600, such as the hard disk 604, before being executed.

The central processing unit 611 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Figure 7:
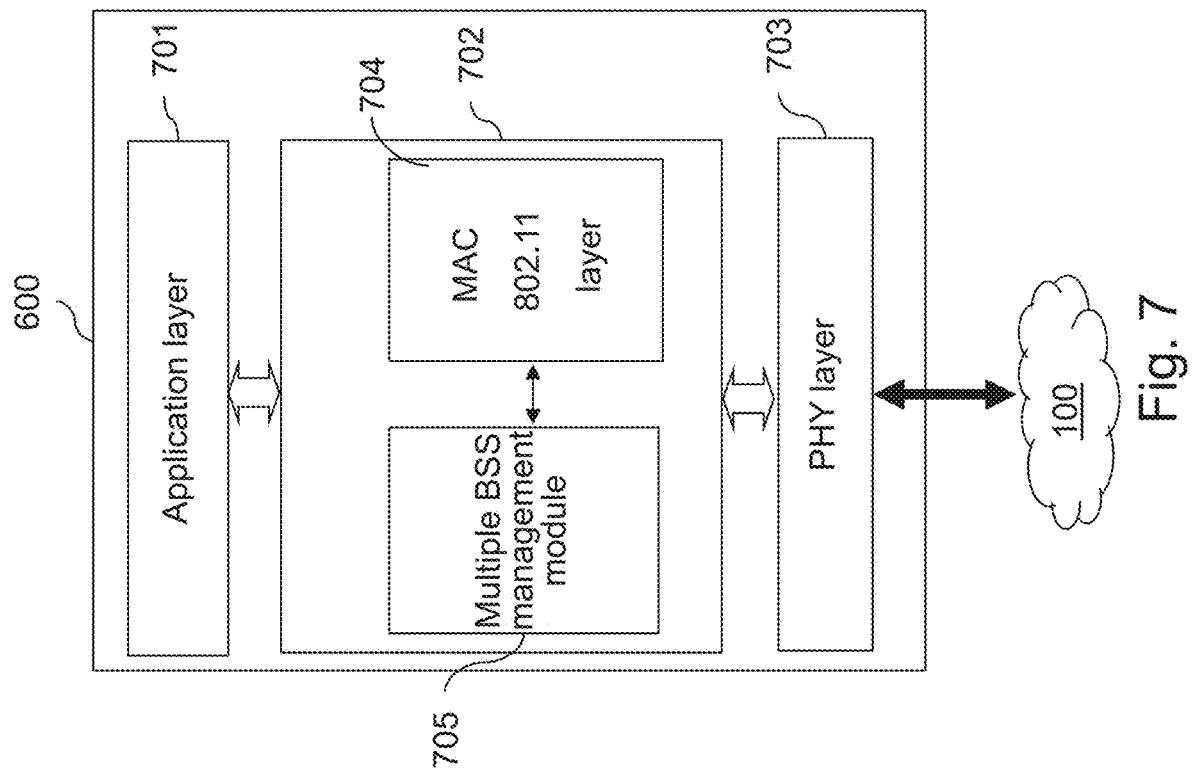
FIG. 7 shows a schematic representation of a wireless communication device in accordance with embodiments of the present invention.

FIG. 7 is a block diagram schematically illustrating the architecture of the communication device 600, either the AP 110 or one of nodes 100-107, adapted to carry out, at least partially, the invention. As illustrated, device 600 comprises a physical (PHY) layer block 703, a MAC layer block 702, and an application layer block 701.

The PHY layer block 703 (here an 802.11 standardized PHY layer) has the task of formatting, modulating on or demodulating from any 20 MHz channel or the composite channel, and thus sending or receiving frames over the radio medium used 100, such as 802.11 frames, for instance medium access trigger frames TF 430 to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 702 preferably comprises a MAC 802.11 layer 704 implementing conventional 802.11ax MAC operations, and an additional block 705 for carrying out, at least partially, the invention. The MAC layer block 702 may optionally be implemented in software, which software is loaded into RAM 612 and executed by CPU 611.

Preferably, the additional block, referred as to multiple BSS management module 705 for controlling access to OFDMA resource units (sub-channels) in case of multiple BBSs, implements the part of the invention that regards device 600, i.e. transmitting operations for a source node, receiving operations for a receiving node, or operations for the AP.

For instance and not exhaustively, the operations for the AP may include generating and sending trigger frames as defined below, i.e. trigger frames identifying a plurality of groups, instead of a single BSS, to reserve a TXOP for multiple BSSs, and then managing the allocation of resource units during the reserved TXOP to the nodes of the various BSSs; the operations for a node different from the AP may include analyzing received trigger frames to determine if the node is allowed to access some resource units in the context the trigger frames allow several BSSs to communicate during the reserved TXOP.

MAC 802.11 layer 704 and multiple BSS management module 705 interact one with the other in order to provide or process accurately trigger frames according to the invention.

On top of the Figure, application layer block 701 runs an application that generates and receives data packets, for example data packets of a video stream. Application layer block 701 represents all the stack layers above MAC layer according to ISO standardization.

Embodiments of the present invention are now illustrated using various exemplary embodiments in the context of IEEE 802.11ax by considering OFDMA sub-channels. Although the proposed examples use the trigger frame 330 (see FIG. 3) sent by an AP for a multi-user uplink transmissions, equivalent mechanisms can be used in a centralized or in an adhoc environment (i.e. without an AP). Also the invention is not limited to the 802.11ax context.

Below, the term legacy refers to non-802.11ax nodes, meaning 802.11 nodes of previous technologies that do not support OFDMA communications.

FIG. 8 illustrates, through timelines, three embodiments in which the nodes of various BSSs can communicate (upload data to AP) during the same reserved TXOP, contrary to the timeline of FIG. 4.

The Trigger Frame is modified to identify a plurality of groups of nodes allowed to perform uplink OFDMA transmission in RUs.

In order that the Trigger Frame is received by all the nodes belonging to a plurality of BSS cells, embodiments provides that the sent trigger frame includes a base BSSID, BASE_BSSID, which is computed from (or similar to) the base 48-bit MAC address of the physical AP, thus identifying the plurality of groups managed by the physical access point. The base BSSID is seen as an AP address commonly known by all nodes managed by the physical AP. The base BSSID may be specified in the TA or RA field 503 or 504 in a header of the trigger frame. The base BSSID is thus seen as a multi-BSS address.

As all the nodes know the base BSSID (which can be transmitted in or retrieved from the beacon frames), they are able to identify it in TA or RA field. Upon detecting the base BSSID, the nodes know they are concerned by the reserved TXOP, thus starting to determine in which RU or RUs forming the TXOP they could transmit data (either through contention for random RUs or through direct access for scheduled RU).

The base BSSID may be the base MAC address of the AP, BASE_BSSID, or be the BASE_BSSID modified to set the n LSBs to zero. This is because, given the scheme for generating the specific BSSIDs for the BSSs by the AP, all the specific BSSIDs have the same 48-n MSBs as BASE_BSSID. Thus, the modified BASE_BSSID is sufficient for the nodes to determine whether or not their BSSs are concerned by the trigger frame. This approach clearly voids the n LSBs, so that the nodes can easily detect their corresponding BSSID is concerned, by bit-masking on the other bits (the 48-n MSBs).

In an alternative embodiment, a multi-BSS address to be used to identify the plurality of groups may be a 48-bit MAC address based on BASE_BSSID (either BASE_BSSID itself of the modified BASE_BSSID with the n LSBs set to 0), wherein one bit, for instance bit #0 (usually called the Individual/Group bit), is set to 1 to indicate it is a group address. In this alternative embodiment, only one bit needs to be tested in order to determine whether the BSSID specified in the trigger frame indicates a plurality of BSSs.

These embodiments provide targeting all the BSSs managed by the same physical AP since the base BSSID of the AP is used as "multi-BSS address" to indicate a plurality of BSSs. Of course, other embodiments may be used that identify a subset of all the AP-managed BSSs available. For instance, the TA or RA field used to define the plurality of BSSs may be used as a 48-bit bitmap which associates each of its bits to a given BSS (in increasing order for instance). It is contemplated that 48 BSSs simultaneously managed by a single AP covers a large number of situations. Thus each bit set to 1 in the 48-bit bitmap indicates that the associated BSS is concerned by the TF.

Figure 9A:
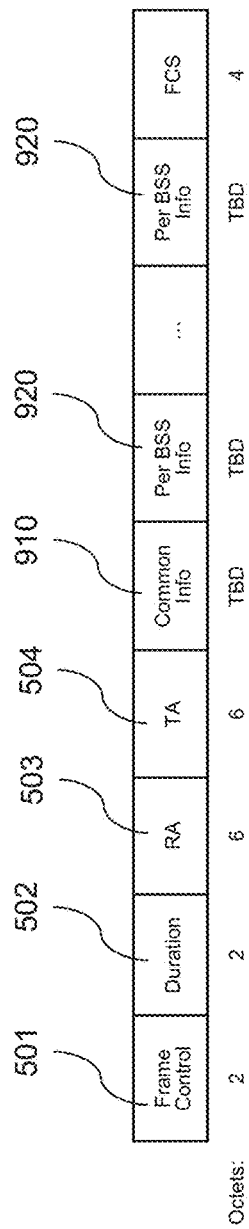
FIGS. 9a, 9b and 9c present a new format of a Trigger frame, adapted for implementations of the invention.
Figure 9B:
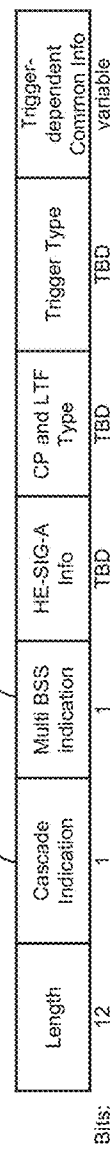

In another alternative embodiment, a multi-BSS address to be used to identify the plurality of groups may be any 48-bit MAC address of one VAP (i.e. any specific BSSID), and the trigger frame format contains an explicit information field for a multiple BSS indication (as further described by field 912 of FIG. 9b). In this embodiment, the trigger frame includes at least one multi-BSS field, the multi-BSS field indicating whether the transmission opportunity provides resources units accessible by nodes of a plurality of groups to transmit data, or not; and each group being uniquely identified by a specific basic service set identification, BSSID, derived from a base BSSID specific to the physical access point, the sent trigger frame includes a specific BSSID of a virtual access point sending the trigger frame.

FIGS. 8a and 8b illustrate respectively first and second embodiments in which a plurality of time slots is cascaded within the TXOP reserved by a first trigger frame. To be more precise, the trigger frame includes a cascading field to indicate the reserved transmission opportunity is split into a plurality of successive time slots, each time slot providing resource units that the nodes access to transmit data. It may be the Cascade Indication subfield 511 defined above. Thanks to this subfield, any node receiving the trigger frame and concerned by the reserved TXOP is able to determine that successive time slots are provided during the TXOP.

FIG. 8a illustrates the first embodiments in which conventional trigger frames are used, except for the use of a multi-BSS address (such as BASE_BSSID) in TA or RA field 503 or 504. It means that a series of TF 330 is used in cascade in order to grant successively uplink communications for each of the desired BSSs, within the TXOP reserved by the very first TF.

In these first embodiments, the physical access point sends a trigger frame before each time slot to announce the time slot with associated resource units to the nodes. As each time slot (and thus trigger frame) is dedicated to a single BSS, each trigger frame sent by the AP includes, in addition to the base BSSID to define the plurality of BSSs concerned by the trigger frame, one specific BSSID corresponding to a group of nodes to which the following time slot and associated resource units are reserved. It means that the nodes have to identify the time slot (and thus trigger frame) dedicated to their BSS. To do so, they determine whether one of the trigger frames received during the reserved transmission opportunity includes, in addition to the base BSSID, a specific BSSID corresponding to their own group, or not;

and in case of positive determining, they access at least one resource unit of the time slot following the determined trigger frame and transmit data over the accessed resource unit to the physical access point.

In an exemplary timeline with two BSSs as shown in FIG. 8a, TF 330-A is used for a first BSS, BSS_1, whereas TF 330-B deals with a second BBS, BSS_2.

After contention or PIFS period elapsed on the medium, the AP sends a first trigger frame 330-A reserving TXOP. To address a plurality of BSSs, the AP indicates BASE_BSSID (or equivalent multi-BSS address that encompasses a plurality of BSSs) in TF 330-A. This indicates to all the nodes that nodes of two or more BSSs will have an opportunity (through RUs) to transmit during TXOP.

The concerned nodes thus do not set their NAV. For the other nodes (other BSSs), the duration in Duration field 502 of the TF is set to an approximate value covering all the duration of the TXOP (the later TF 330-B will decrease and more finely tune the remaining duration).

In one embodiment, TA field 504 is set to identify the plurality of BSSs concerned by the TXOP, either a list of BSSIDs or REF_BSSID as mentioned above. RA field 503 is set to a specific BSSID value corresponding to a single BSS that is allowed to communicate during the time slot 310-A following TF 330-A. In the example of FIG. 8a, RA field 503 includes BSSID_1 in order to inform the nodes of BSS 1 that they will have opportunities (RUs) to upload data.

In an alternative embodiment, the opposite scheme is implemented, wherein BASE_BSSID or the like to identify a plurality of BSSs is set in RA field 503 field to inform of the multiple BSS support, while a specific BSSID is set in TA 504 to inform that the following time slot is allocated to the corresponding BSS.

TF 330-A has its Cascade Indication subfield 511 set to 1 to indicate a plurality of TFs (including itself) is expected. Since BASE_BSSID is indicated in the frame header, the plurality of TFs, and corresponding transmission time slots, will be provided during the same TXOP reserved by the first TF.

If Cascade Indication subfield 511 is not set, meaning the reserved TXOP includes only one BSS, there is no multiple BSS scheme. The nodes not concerned by the unique TF 330 as indicated through the specific BSSID specified in TA or RA field may defer and set its NAV to the Duration Field 502.

The nodes of BSS 1 can thus transmit data during time slot 310-A when they access the resource units, either through scheduled RUs or random RUs (as specified in the Per User Info fields 520). The AP may acknowledge (ACK/BA) the received data.

Note that the time length of timeslot 310-A may be defined in "HE-SIG-A Info" field 512. This is because 802.11ax standard mandates the AP to set the value of the timeslot in this field 512. This field, that conventionally defines the time duration for the whole TXOP, is now used for a subpart of the TXOP, namely each timeslot per BSS (UL MU PPDU duration per BSS).

Thanks to this "HE-SIG-A Info" field, the trigger frame may include an indication of a duration of at least one time slot within the reserved transmission opportunity to drive the nodes to end their transmissions during the at least one time slot at the same time.

Next, after a SIFS duration (less than the PIFS duration of FIG. 4) the AP sends another trigger frame 330-B to provide another time slot for a second BSS, BSS 2. TF 330-B thus includes BSSID_2 and BASE_BSSID (or the like) in the TA and RA fields.

The AP may also refine the duration of TXOP through a new value in the Duration field 502.

As for the first time slot, the nodes of BSS 2 access the resource units forming 300-B to transmit data.

This scheme can be iterated any number of times to offer new uplink communication time slots to the various BSSs.

Once a node has found its corresponding TF and has transmitted its uplink data during 310, it may enter in doze mode for each successive remaining TF, or may wait for a new TF specifying again the BSSID of its own BSS during the reserved TXOP.

The above shows that, whatever the option selected for the base BSSID and the specific BSSID to be specified in one and the other of transmitter and receiver address fields in a header of the trigger frame, the usage of common BASE_BSSID (or the like) and specific BSSID makes it possible for the nodes to detect multiple BSS support and to locate their assigned TF(s) and transmission time slot(s).

In a slight variant as introduced above, instead of using the base BSSID, only the specific BSSID may be indicated in the trigger frame, together with a separate multi-BSS indication (912 discussed below for instance). Bit-masking on the specific BSSID makes it possible for all the nodes to determine whether they are concerned or not by the current reserved TXOP, in case the multi-BSS indication is enabled.

The first embodiments reduce channel occupation duration because only one single medium access is performed and the next TF can be sent using reduced mandatory PIFS interframe space given the priority of the AP due to the reserved TXOP.

FIG. 8b illustrates the second embodiments in which a single initial trigger frame is used to define the allocation of resource units in the successive time slots forming the reserved TXOP.

In these second embodiments, the trigger frame includes a list of BSSIDs defining to which groups of nodes the successive time slots and associated resource units are respectively reserved. The list of BSSIDs may be formed of a set of successive information fields in the trigger frame, each field defining a time slot allocation for one or more BSSIDs.

Any node concerned by the received TF (because its BSS is included in the set of BSSIDs indicated in the TF) can thus read the list of BSSIDs from the trigger frame; determine, based on the read list of BSSIDs, one of the time slots that is at least reserved to its own group (a time slot may be reserved for a plurality of groups, using for instance a multi-BSS address, such as REF_BSSID); and access at least one resource unit of the determined time slot and transmit data over the accessed resource unit to the physical access point.

As shown in the exemplary timeline of FIG. 8b, one single TF 830 is used for directing UL MU transmission of several BSS successively. To achieve that, TF 830 follows a new format, an example of which is described below with reference to FIG. 9, in order to provide a list of BSSIDs and inform that each BSSID is allowed to occur in cascading scheme.

FIG. 9a illustrates the MAC format of trigger frame 830. The MAC header portion is the same as TF 330 of 802.11ax standard shown in FIG. 5a above. This is to keep compliancy with the MAC protocol. Thus, the BASE_BSSID (or the like to identify a plurality of BSSs) may be used in TA or RA field as explained above to indicate multiple BSS scheme.

In the case of FIG. 8b (and also 8c described below), as the trigger frame is general for all the timeslots, the TA and RA fields are used at most only to provide multi-BSS capability. As a result, the TA field 504 may be set to BASE_BSSID (or the like) in order to advertise the nodes that the TXOP follows a multiple BSS scheme. The RA field 503 is the address of the intended recipient nodes: either a wildcard address is used as a broadcast indication, or either BASE_BSSID is used again.

The payload of trigger frame 830 is also formed of one Common Info field 910 that may slightly differ from field 510 and a series of Per BSS Info fields 920 which differ from fields 520 to define the allocation of the successive time slots.

As shown in FIG. 9b, The "Common Info" field 910 has the same format as 510, except that a new bit field, "multi BSS indication" 912, is added to inform, as a double check, of the new format used by the trigger frame. Multi BSS indication 912 is set to 1 (enabled) if the requested TXOP is dedicated to a group of BSSs; and set to 0 otherwise. Thus, the trigger frame includes, in addition to transmitter and receiver address fields, a parameter section including at least one multi-BSS field, the multi-BSS field indicating whether the transmission opportunity provides resources units accessible by nodes of a plurality of groups to transmit data, or not.

However, the same information can be deduced from the use of BASE_BSSID (or the like as defined above) in TA or RA field 503 or 504 of MAC frame header as described above. As a consequence, Common Info field 910 is optional to explicitly declare the multiple BSS scheme, and conventional Common Info field 510 (i.e. without multi-BSS indication 912) may also be used in which case multiple BSS scheme is only declared through the use of a multi-BSS address such as BASE_BSSID in the MAC header.

Of course, in case it is decided the BASE_BSSID or the like to identify the plurality of BSSs is not specified in the MAC frame header, multi-BSS indication bit 912 becomes mandatory in order to detect the multiple BSS format of the TF. Common Info field 910 thus becomes mandatory instead of Common Info field 510.

Detection of multiple BSS scheme is required to distinguish between the format of TF 330 and the format of TF 830.

The above shows that at least two means to allow determining if the next fields follow conventional format 520 or format 920 as now described are provided. As a consequence, by reading the multi-BSS field, a node can determine a structure format of a per-BSS parameter section additional to transmitter and receiver address fields in the received trigger frame.

Figure 9C:
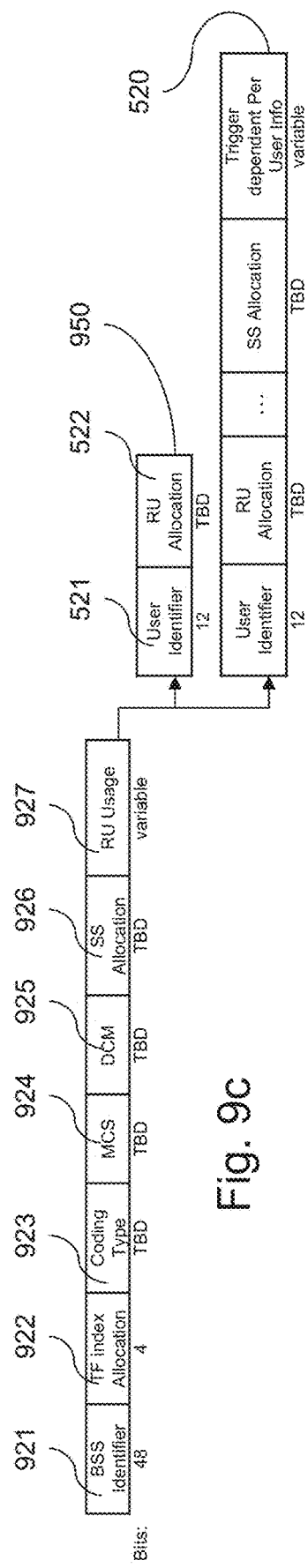

FIG. 9c discloses an exemplary format of Per BSS Info field 920 that gives BSS information for allocating time slots and resource units. Usually, A plurality of per-BSS parameter sections, namely Per BSS Info fields 920, is used in the trigger frame, at least current one (preferably each one) of the per-BSS parameter sections defining an allocation of resource units to nodes. The plurality of sections 920 makes it possible to define the allocation of all the time slots forming the reserved TXOP.

BSS identifier field 921 is used to identify a specific BSS (through a specific BSSID). It means the BSSID field identifies one specific group of nodes concerned by the allocation.

BSS identifier field 921 may be a 6-byte address field, in order to receive a full BSSID, which may for instance be the specific BSSID of a specific BSS. In other words, a BSSID in at least one of the BSSID fields is the specific BSSID of one group.

In variants, as the TF has already been successfully filtered by the TA/RA couple through the MAC header (including BASE_BSSID or the like information), it is sufficient to only distinguish between the possible specific BSSIDs generated from BASE_BSSID. Thus a shorter identifier can be used, for instance index (i) identifying the $i^{th}$ BSSID within the multiple specific BSSIDs derived from the base BSSID (BASE_BSSID), where i is less than $2^n-1$. The BSSID field is thus n-bit long, where n is the number of bits varying between the specific BSSIDs compared to the base BSSID.

Given the indication provided in BSS identifier field 921, the plurality of Per BSS Info fields 920 lists a cascade of BSSs.

TF Index Allocation field 922 is used in coordination with Cascade Indication field 511 to indicate the index of the timeslot concerned by the allocation defined in the current Per BSS Info field 920. In other words, it defines the timeslot the BSS indicated in BSS identifier field 921 will be allowed to use for uplink communication, The timeslots may be indexed with an increasing numbering from the beginning of the reserved TXOP.

Fields 923 to 926 are common parameters of the current BSS, and are equivalent to parameters 523 to 526.

One or more RU Usage fields 927 are then provided.

RU Usage field 927 has the same function as Per User Info field 520 of FIG. 5c, namely defining the allocation of the resource units forming the timeslots identified in field 922 to the nodes belonging to the BSS identified in field 921. A plurality of RU Usage fields 927 makes it possible to define the allocation of each RU forming the timeslots identified in field 922. These fields are thus used to finely tune the RU usage per BSS (or per a given set of BSS if a bitmap is used in 921).

In the example shown in the Figure, two formats 950 and 520 are proposed.

Format 950 is the simplest format and comprises only two fields: User Identifier subfield 521 includes the Association IDentifier (AID) of the node (belonging to the BSS identified in field 921) to which the RU or RUs identified in RU Allocation field 522 is/are allocated, to transmit the MPDU(s) in the uplink direction. AID is set to 0 to define random RUs; otherwise it is set to a specific node AID.

Format 520 reuses the entire format of "Per User Info Field" 520 defined above.

Use of either format may be specified using a dedicated bit before the RU Usage fields 927.

Of course, the trigger frame may mix RU Usage fields 927 conforming to format 920 and others conforming to format 520. In this case, use of either format may be specified using a dedicated bit before each RU Usage field 927.

Any node that wants to know which RU it can access thus has to:
1) read, within the received trigger frame, a plurality of per-BSS parameter sections 920 additional to transmitter and receiver address fields 503, 504;
2) for at least one per-BSS parameter section 920 defining an allocation of resource units to nodes:
   determine, based on one BSSID field 921 included in the per-BSS parameter section, whether its own group is concerned by the allocation or not,
   determine, based on one timeslot field 922 in the per-BSS parameter section, which time slot is concerned by the allocation, the reserved transmission opportunity being either made of one time slot or split into a plurality of time slots, each resource unit being accessed by a single node during a time slot to transmit data, and
   determine, based on one or more RU usage fields 927 in the per-BSS parameter section, one or more resource units in the concerned time slot and whether said node is authorized to access the one or more determined resource units.

Next, in case the node is authorized to access the one or more determined resource units, it accesses at least one of the determining resource units during the reserved transmission opportunity and transmits data over the accessed resource unit to the physical access point.

Back to FIG. 8b, the trigger frame thus has two Per BSS Info fields 920, the first one indicating the first timeslot 310-A (as example "1" in field 922) is allocated to BSS 1 (field 921 set to BSSID_1), while the second one indicates the second timeslot 310-B (as example "2" in field 922) is allocated to BSS 2 (field 921 set to BSSID_2), Thus the nodes of BSS 1 access the RUs of 310-A according to the RU allocation defined in RU usage fields 927 of the first Per BSS Info field 920, to transmit data to the AP. Once timeslot 310-A for uplink ends, the AP acknowledges reception of the data. As mentioned above, the time length of timeslot 310-A may be defined in "HE-SIG-A Info" field 512. As a plurality of timeslots is provided, the "HE-SIG-A Info" field may be formed to define the successive time duration of each timeslot.

Next, after a SIFS, the second timeslot 310-B starts. It means that an acknowledgment, sent by the physical access point, of data transmitted by nodes in a previous time slot 310-A triggers the start of a next time slot 310-B during the reserved transmission opportunity TXOP. And the next time slot starts after a predefined time period (e.g. a SIFS) after the transmission of the acknowledgment by the physical access point. The acknowledgment ACK/BA of the preceding transmission thus serves as a synchronization point for the next UL MU transmission of a next BSS.

It follows that the nodes of BSS 2 can access the RUs of 310-B according to the RU allocation defined in RU usage fields 927 of the second Per BSS Info field 920 (in the trigger frame), to transmit data to the AP. Once timeslot 310-B for uplink ends, the AP acknowledges reception of the data.

Of course, one understands that a larger number of timeslots can be provided, that follow the mechanism as described above, to provide RUs for successive BSSs.

As readily apparent from FIG. 8b, channel occupation due to control frames, in particular due to the trigger frames, is substantially reduced compared to the first embodiments. This is because only a single TF is sent that defines the allocation of RUs for a plurality of successive timeslots.

The second embodiments particularly provide high benefits in case of high-loaded cells, i.e. where the total number of available RUs is not enough to fulfil the need of the at least two BSSs.

FIG. 8c illustrates the third embodiments in which a plurality of BSSs shares the simultaneous RUs of the same timeslot. Indeed, the reserved transmission opportunity includes resource units that are accessed simultaneously by the nodes (e.g. through OFDMA).

In these third embodiments, the trigger frame assigns at least a first resource unit and a second simultaneous resource unit to respectively a first group of nodes and a second and distinct group of nodes. It requires for each node concerned by the trigger frame to determine a subset of the simultaneous resources units that is assigned to its own group (BSS to which it belongs), and in case the subset is not empty (it may be made of one or more RUs), to access at least one resource unit of the determined subset and transmit data over the accessed resource unit to the physical access point.

The trigger frame thus needs to define the allocation of simultaneous RUs to the various BSSs. Next the allocation of RUs to nodes within a given BSS can follow the conventional scheme described above.

The format of TF as explained above with reference to FIG. 9 can be used.

The general format of TF as shown in FIG. 9a and the format of Common Info field 910 of FIG. 9b are the same as above. Note that the Cascade Indication field 511 can be set to 0 in the case a single timeslot is provided, as it is the case in FIG. 8c.

Regarding the Per BSS Info field 920 of FIG. 9c, it must be noted that, in the case of FIG. 8c, a single timeslot is provided. Thus TF Allocation field 922 is optional and can be absent (the rule is that if Cascade Indication field 511 is set to 0, there is no field 922). This is to save some bits and thus channel occupation. Of course, in a variant, TF Allocation field 922 can be kept in any case, and be set to 1 (to designate the sole timeslot) in case of a single timeslot.

Still regarding the Per BSS Info field 920, the third embodiments provide that the same timeslot is shared between various BSSs. Thus, a plurality of Per BSS Info field 920 can be used, each one dedicated to a single BSS (identified in BSS identifier field 921) but for the same timeslot, and defining, through one or more RU Usage fields 927, the allocation to its nodes of RUs reserved for this BSS in the timeslot.

In the third embodiments, an AP managing several virtual-APs can dynamically and finely tune the number of RUs per BSSID to occur in parallel (simultaneously).

As an example, if a BSS encounters a low number of nodes or medium contention (typically a "guest" network having poor utilization), then the AP may decide to allocate a limited number of RUs to this BSS, and provide a higher number of RUs to another and denser BSS.

Sharing the simultaneous RUs of the same TXOP or timeslot between various BSSs thus makes it possible to avoid using specific trigger frames for low-used BSSs, which is very time and bandwidth-consuming compared to the limited need.

As a consequence, the AP may dynamically adjust the number of RUs to each BSS, according to TXOP history. In other words, the number of simultaneous resource units assigned to each group of nodes (BSS) may depend on use statistics of use of resource units by each group in one or more previous transmission opportunities.

Fourth embodiments not shown in the Figures combine the second and third embodiments. It means that with a single trigger frame, a plurality of successive timeslots is defined, one or more of the timeslots providing simultaneous RUs assigned to nodes of different BSSs. Preferably, all the timeslots are shared between BSSs.

The Cascade Information field 511 is thus set to 1.

Fifth embodiments may apply to any of the second to fourth embodiments.

The fifth embodiments consist in letting some RUs or timeslots opened to access to a plurality of BSSs. In other words, there is no specific allocation provided to RUs. A consequence is that a pure random access by two or more (preferably all the BSSs managed by the AP) is achieved.

This approach can be considered as an overall broadcast BSS, in order to collect the overall needs (node management like registration, buffer status, etc.) of the BSSs managed by an AP.

Various degrees of this approach can be achieved.

At RU level, the trigger frame defines at least one resource unit that is accessible by any node from any one of two or more BSSs. Before accessing this resource unit, any node must check whether its own BSS correspond to one of the two or more BSSs as specified.

At timeslot level, the trigger frame defines that all the resource units of at least one time slot are accessible by any node from any one of two or more groups, the reserved transmission opportunity being either made of one time slot or split into a plurality of time slots, each resource unit being accessible by a single node during a time slot to transmit data.

At TXOP level, the trigger frame defines that all the resource units in the reserved transmission opportunity are accessible by any node from any one of two or more groups.

The same format of TF as defined above with reference to FIG. 9 can be used.

However, since one or more RUs are assigned to a plurality of BSSs, BSS identifier field 921 can be used to indicate a plurality of BSSs (through a list of BSSIDs or using a multi-BSS address such as BASE_BSSID or using a bitmap). In that case it means the BSSID field identifies a plurality of groups of nodes concerned by the allocation.

In case BSS identifier field 921 is a 6-byte address field, it can directly receive BASE_BSSID or any multi-BSS address that identify a group of BSSIDs or a 48-bit bitmap. In other words, a value in the BSSID field may be the base BSSID so that all the groups of nodes are concerned by the allocation defined by the current per-BSS parameter section 920.

Instead of setting a BSSID identifying a plurality of groups of nodes, or a corresponding index, BSS identifier field 921 may receive a bitmap as briefly introduced above, each bit in the bitmap being associated with a respective group of nodes (according to an increasing numbering order for instance, like a BSS index). This makes it possible to define any group of BSSs. The BSS associated with each bit of the bitmap is known by all the nodes, including the AP.

For instance, an 8-bit bitmap for 921 supports up to 8 BSSs. Longer bitmaps can be used to adapt to the number of BSSs simultaneously managed by the physical AP.

The use of a bitmap advantageously allows a common configuration for several BSSs to be set in a single "Per BSS Info" field 920. Any node receiving the trigger frame and belonging to a BSS concerned by the TF will analyze the embedded Per BSS Info fields 920 to determine which field 920 defines a RU allocation for its BSS. To do so, it first reads each bitmap in each Per BSS Info field 920 in order to determine whether the bit associated with its own group is enabled in the bitmap so that its group is concerned by the allocation defined in the current Per BSS Info field 920.

The RU Usage fields 927 defined above can be used, with AID=0 in field 521 to allow any node of the BSSs indicated in BSS identifier field 921 to contend for access to the RUs indicated in field 522.

In the particular case where the RU or timeslot or TXOP is let opened to access to all the BSSs managed by the physical AP, RU Usage field 927 can be empty because all the BSSs use the same parameters.

Figure 10:
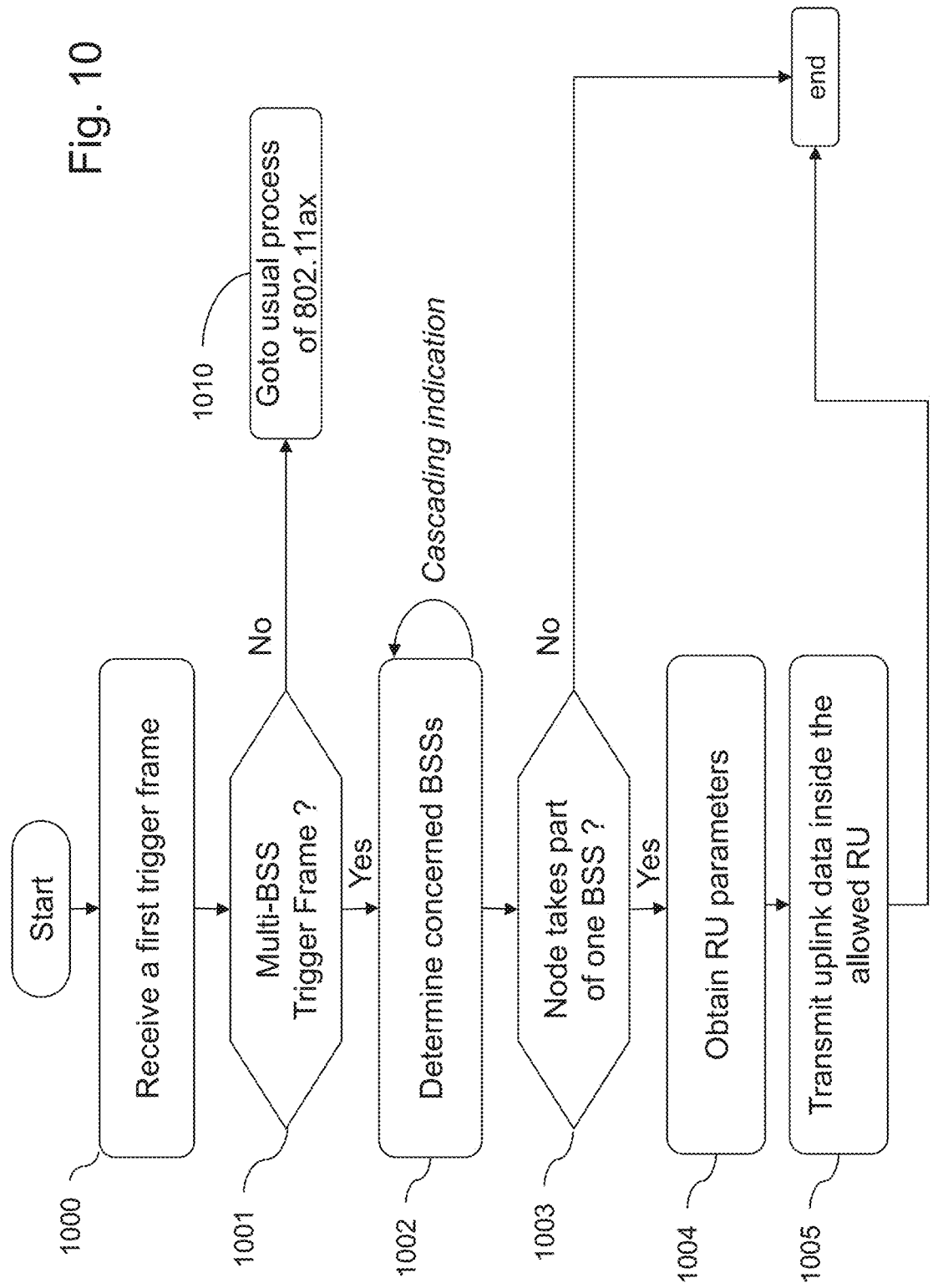
FIG. 10 illustrates, using a flowchart, general steps of a node receiving a Trigger Frame with multiple BSS support, according to embodiments of the invention.

FIG. 10 illustrates, using a flowchart, general steps of a method according to the invention at one node 600 different from the AP.

At step 1000, node 600 receives a Trigger frame from an Access Point.

If the receiving node belongs to a BSS (or virtual BSS) of the transmitting AP, the Trigger Frame is not filtered by the PHY layer as defined in the standard. The filtering is made on so-called "colors" defined in the 802.11ax standard, which mandates that the BSS colors of all the multiple BSSs managed by a single AP are the same.

At step 1001, node 600 analyzes the received trigger frame at the MAC layer (fields in FIG. 5a or 9a). In particular, TA and RA fields 503, 504 are analyzed.

It checks whether the received TF defines a multiple BSS scheme, from which it is registered with.

It consists in checking whether one of TA or RA defines a plurality of BSSis, e.g. a set of BSSIDs, or not, i.e. if it includes BASE_BSSID or any other multi-BSS address (e.g. a bitmap) or a multi-BSS indication 912 that is enabled.

If no multiple BSS scheme is used or the multi-BSS address does not encompass the specific BSSID of node 600 (e.g. does not match BASE_BSSID to which node 600 is registered), conventional process is implemented at step 1010.

Otherwise, step 1002 is performed to determine whether its BSS is concerned by the TXOP or not. This may be based on two items of information:
first, whether or not the BSSID of its own BSS belongs to a set of BSSIDs defined by the multiple BSS scheme of the trigger frame; and
second, if the Cascade Indication field 511 is set to 1 (a plurality of timeslots is provided), whether or not the BSSID of its own BSS is indicated in at least one BSS Identifier field 921 (in which case a timeslot is allocated to its own BSS).

In case of negative determination (output "no" at test 1003), algorithm ends and the node delays for the time duration specified in Duration Field 502.

Otherwise, step 1004 is executed to determine the RU or RUs the node can access, either through contention or because the RU is scheduled to it.

In the first embodiments, the Cascade Indication field 511 is set to 1 and node 600 waits for a trigger frame having a RA specifying the specific BSSID of the BSS to which node 600 belongs. It may be the first TF or any successive TF within the reserved and granted TXOP. Upon detecting a TF dedicated to its own BSS, the Per User Info fields 520 make it possible for node 600 to know exactly the RU or RUs it can access (if AID=0 in field 521, the RU identified in field 522 can be accessed through contention, while if field 521 stores the AID of node 600, the RU identified in field 522 can be accessed directly without contention).

In the second to fifth embodiments, the Per BSS Info field 920 of the received trigger frame is deeply analyzed by node 600 to determine the RU or RUs it can access.

It first requires finding the one or more Per BSS Info fields 920 that its own BSS is concerned with. This is achieved by analyzing BSS Identifier field 921 which should either set the specific BSSID of the BSS of node 600 or a multi-BSS address (including a broadcast address) that encompasses the specific BSSID of its own BSS.

Once such Per BSS Info fields 920 have been found, the corresponding timeslots are determined using TF index Allocation field 922. Node 600 thus now knows the timeslots its own BSS is concerned with.

Next, for each of these timeslots, node 600 determines to which RU or RUs it is eligible for access. This includes the random RUs and the scheduled RUs. This determining is made by analyzing the RU Usage fields 927 defined in the found Per BSS Info fields 920. The RU or RUs identified in field 522 for which User Identifier 521 is the AID of node 600 are scheduled RU or RUs allocated to this node only. On the other hand, the RU or RUs identified in field 522 for which User Identifier 521 is AID=0 are random RU or RUs to which node 600 can access through contention.

As a consequence, node 600 knows the RU or RUs it can access.

In embodiments, RU allocation by the AP may provide only one RU to a given node. In that case, once an RU node 600 can access has been identified, the analysis of the RU Usage fields 927 ends.

Next to step 1004, step 1005 is performed during which node 600 accesses one (or more) of the RUs determined at step 1004 and transmits its trigger-based PPDU in uplink direction to the AP. As mentioned above, the UL PPDU shall end at the time indicated in the "HE-SIG-A Info" field 512 of the Trigger frame that solicited the TXOP.

In the first, second, fourth and fifth embodiments, it may require for the node to wait for the appropriate timeslot, as specified in field 922.

Preferably, node 600 uses its own specific BSSID in RA field of MAC header of UL frame (instead of BASE_BSSID as mentioned in the trigger frame). This indication helps the AP to classify the received UL frames per BSS (note also that a node is definitively identified by its AID along with the BSSID context).

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:
1. A communication apparatus comprising:
at least one memory that stores a set of instructions; and
at least one processor that executes the instructions, the instructions, when executed, causing the communication apparatus to perform operations comprising:
starting an act as a first access point managing a first basic service set, in which the first access point is identified by a first basic service set identifier,
starting an act as a second access point managing a second basic service set, in which the second access point is identified by a second basic service set identifier different from the first basic service set identifier,
transmitting a first trigger frame which triggers uplink multi user, MU, communication and includes first identification information for identifying that an address of a communication which is to be triggered is an address of the first access point,
receiving, from at least one station, STA, which has received the first trigger frame in response to the first trigger frame, a frame addressed to the first access point,
transmitting a second trigger frame which triggers the uplink MU communication and includes second identification information for identifying that an address of communication which is to be triggered is an address of the second access point; and
receiving, in response to the second trigger frame, from at least one STA which has received the second trigger frame, a frame directed to the second access point,
wherein the first basic service set identifier and the second basic service set identifier are 48-bit addresses, a most significant N bit of the first basic service set identifier is equal to a most significant N bit of the second basic service set identifier, and a least significant M bit of the first basic service set identifier is different from a least significant M bit of the second basic service set identifier, and
wherein a total of the most significant N bit and the least significant M bit is 48-bit.

2. The communication apparatus according to claim 1, wherein a first Service Set Identifier which is a character string for identifying the first access point is different from a second Service Set Identifier which is a character string for identifying the second access point.

3. The communication apparatus according to claim 1, wherein the operations further comprise controlling third identification information which is common to the first basic service set identifier and the second basic service set identifier.

4. The communication apparatus according to claim 3, wherein the third identification information is further included in the first trigger frame and the second trigger frame.

5. The communication apparatus according to claim 1, wherein the first trigger frame and the second trigger frame are trigger frames according to Institute of Electrical and Electronics Engineers (IEEE) 802.11 standard.

6. The communication apparatus according to claim 5, wherein the first trigger frame and the second trigger frame are trigger frames for reserving a transmission opportunity using an Orthogonal Frequency Division Multiple Access (OFDMA) transmission technique.

7. The communication apparatus according to claim 1, wherein primary channels of the first access point identified based on the first basic service set identifier and the second access point identified based on the second basic service set identifier are common.

8. A communication method comprising, at a communication apparatus:
    starting an act as a first access point managing a first basic service set, in which the first access point is identified by a first basic service set identifier,
    starting an act as a second access point managing a second basic service set, in which the second access point is identified by a second basic service set identifier different from the first basic service set identifier,
    transmitting a first trigger frame which triggers uplink multi user, MU, communication and includes first identification information for identifying that an address of communication which is to be triggered is an address of the first access point,
    receiving, from at least one station, STA, which has received the first trigger frame in response to the first trigger frame, a frame addressed to the first access point,
    transmitting a second trigger frame which triggers the uplink MU communication and includes second identification information for identifying that an address of communication which is to be triggered is an address of the second access point; and
    receiving, in response to the second trigger frame, from at least one STA which has received the second trigger frame, a frame directed to the second access point,
    wherein the first basic service set identifier and the second basic service set identifier are 48-bit addresses, a most significant N bit of the first basic service set identifier is equal to a most significant N bit of the second basic service set identifier, and a least significant M bit of the first basic service set identifier is different from a least significant M bit of the second basic service set identifier, and
    wherein a total of the most significant N bit and the least significant M bit is 48-bit.

9. The communication method according to claim 8, wherein a first Service Set Identifier which is a character string for identifying the first access point is different from a second Service Set Identifier which is a character string for identifying the second access point.

10. The communication method according to claim 8, further comprising controlling third identification information which is common to the first basic service set identifier and the second basic service set identifier.

11. The communication method according to claim 10, wherein the third identification information is further included in the first trigger frame and the second trigger frame.

12. A non-transitory computer-readable medium storing a program which, when executed by a microprocessor or computer system in a communication apparatus causes the communication apparatus to perform the following steps:
    starting an act as a first access point managing a first basic service set, in which the first access point is identified by a first basic service set identifier,
    starting an act as a second access point managing a second basic service set, in which the second access point is identified by a second basic service set identifier different from the first basic service set identifier,
    transmitting a first trigger frame which triggers uplink multi user, MU, communication and includes first identification information for identifying that an address of communication which is to be triggered is an address of the first access point,
    receiving, from at least one station, STA, which has received the first trigger frame in response to the first trigger frame, a frame addressed to the first access point,
    transmitting a second trigger frame which triggers the uplink MU communication and includes second identification information for identifying that an address of a communication which is to be triggered is an address of the second access point; and
    receiving, in response to the second trigger frame, from at least one STA which has received the second trigger frame, a frame directed to the second access point,
    wherein the first basic service set identifier and the second basic service set identifier are 48-bit addresses, a most significant N bit of the first basic service set identifier is equal to a most significant N bit of the second basic service set identifier, and a least significant M bit of the first basic service set identifier is different from a least significant M bit of the second basic service set identifier, and
    wherein a total of the most significant N bit and the least significant M bit is 48-bit.

* * * * *